US012749819B2

(12) United States Patent
Crouch et al.

(10) Patent No.: US 12,749,819 B2
(45) Date of Patent: Sep. 29, 2026

(54) CONFORMAL WAVEFRONT TRANSFORMER AND METHOD OF MAKING

(71) Applicant: Raytheon Company, Waltham, MA (US)

(72) Inventors: David D. Crouch, Farragut, TN (US); Hooman Kazemi, Thousand Oaks, CA (US); Alexander B. Brailovsky, Irvine, CA (US)

(73) Assignee: Raytheon Company, Arlington, VA (US)

( * ) Notice: Subject to any disclaimer, the term of this patent is extended or adjusted under 35 U.S.C. 154(b) by 125 days.

(21) Appl. No.: 18/451,893

(22) Filed: Aug. 18, 2023

(65) Prior Publication Data

US 2025/0062543 A1 Feb. 20, 2025

(51) Int. Cl.
*H01Q 19/10* (2006.01)
*H01Q 15/14* (2006.01)

(52) U.S. Cl.
CPC ........... *H01Q 19/104* (2013.01); *H01Q 15/14* (2013.01)

(58) Field of Classification Search
CPC .. H01Q 19/104; H01Q 19/065; H01Q 19/195; H01Q 15/14; H01Q 15/04; H01Q 15/0013; H01Q 1/38; H01Q 1/425; H01Q 3/46; H01Q 13/18; H01Q 15/0006; H01Q 15/22; H01Q 19/10; H01Q 15/242; H01Q 15/02; H01Q 15/10; H01Q 19/06
See application file for complete search history.

(56) References Cited

U.S. PATENT DOCUMENTS

| | | | | |
|---|---|---|---|---|
| 4,905,014 A | 2/1990 | Gonzalez | | |
| 6,768,468 B2 | 7/2004 | Crouch | | |
| 8,350,751 B2 * | 1/2013 | Edvardsson | H01Q 1/225 | 73/290 R |
| 2003/0058189 A1 * | 3/2003 | Crouch | H01Q 19/104 | 343/912 |
| 2024/0387992 A1 * | 11/2024 | Makino | H01Q 3/46 | |

FOREIGN PATENT DOCUMENTS

| | | | |
|---|---|---|---|
| WO | WO-2017011066 A1 * | 1/2017 | F41H 13/0068 |

* cited by examiner

*Primary Examiner* — Dameon E Levi
*Assistant Examiner* — Gurbir Singh

(57) ABSTRACT

A wavefront transformer for reflecting and transforming an incident electromagnetic wavefront includes an electrically-conductive substrate with spaced perforations (cavities), which may have uniform spacing and varying depth. The perforations may have a radius that is close to and greater than a cutoff radius for one or more intended incident frequencies of the incident wavefront. The spaced perforations may be filled with air or may be filled with a dielectric solid material. The substrate may be covered with a cover made of a dielectric solid material. The transformer may be made by drilling holes in the substrate. Alternatively a plate having protrusions on it corresponding to the desired perforations may be used to form the perforations on the substrate. The plate may be removed or left in place after the formation of the perforations.

20 Claims, 17 Drawing Sheets

CONFORMAL WAVEFRONT TRANSFORMER AND METHOD OF MAKING

GOVERNMENT LICENSE RIGHTS

This disclosure was made with Government support under contract number HQ0727-16-D-0006, awarded by the United States Army. The Government has certain rights in the invention.

FIELD

The present disclosure is related to a reflecting surface for synthesis of reflected wavefronts therefrom for use in reflecting antennas and mirrors, for example, a wavefront being a surface of constant phase. More particularly, the present disclosure is related to a system and method of making and using such a reflecting surface that is particularly useful for reflecting millimeter-wave frequencies.

BACKGROUND

Reflecting antennas and mirrors, such as those used in beam-waveguide systems, tend to be difficult and expensive to build for millimeter-wave frequencies because the mechanical tolerances required to achieve the best signal are difficult to attain. For example, as a general rule the reflecting surface of a parabolic reflector must conform to the ideal paraboloid to within approximately one-fiftieth of a wavelength. At a frequency of 100 GHz, this corresponds to a tolerance of approximately 2 mils (about 50.8 μm). As the frequency and/or the size of the reflector increases, holding the required tolerance becomes more difficult. A regular curved surface, such as a paraboloid or hyperboloid, may be difficult to manufacture to a high degree of precision.

As difficult as it can be to manufacture a regular curved surface, some applications require an irregular curved surface in order to produce a desired far-field pattern, or an irregular reflecting surface (in a beam-waveguide system, for example) to correct the phase of the incident beam. Depending on the frequency and the required degree of irregularity, such a curved surface may be cost prohibitive to machine and in some cases impossible to manufacture with current manufacturing techniques.

In addition it may be difficult to conform a curved surface to an existing structure, which in general may not have a shape with a similar curvature. Further, it also may be difficult to integrate curved configurations into load bearing structures.

SUMMARY

According to an aspect of the disclosure, a wavefront transformer for transforming an incident electromagnetic wavefront having a given shape to a reflected wavefront having a different shape, the wavefront transformer including: a substrate having a conductive surface for reflecting the incident electromagnetic wavefront, the incident electromagnetic wavefront having one or more intended incident frequencies; wherein the substrate has uniformly spaced perforations, each of the perforations having substantially the same radius; wherein the perforations have varying depths, with the depths of the perforations configured to impose a desired transformation on the incident electromagnetic wavefront; and wherein the radius of the perforations is within 25% of a cutoff radius for the lowest of the one or more intended incident frequencies, the cutoff radius being a radius for which a waveguide phase propagation constant of the lowest of the one or more intended incident frequencies is zero.

According to an embodiment of any paragraph(s) of this summary, the radius of the perforations is within 20% of the cutoff radius for the lowest of the one or more intended incident frequencies.

According to an embodiment of any paragraph(s) of this summary, the radius of the perforations is within 15% of the cutoff radius for the lowest of the one or more intended incident frequencies.

According to an embodiment of any paragraph(s) of this summary, the radius of the perforations is within 10% of the cutoff radius for the lowest of the one or more intended incident frequencies.

According to an embodiment of any paragraph(s) of this summary, the radius of the perforations is within 5% of the cutoff radius for the lowest of the one or more intended incident frequencies.

According to an embodiment of any paragraph(s) of this summary, the perforations are circular in cross section.

According to an embodiment of any paragraph(s) of this summary, each of the perforations forms a cylindrical cavity.

According to an embodiment of any paragraph(s) of this summary, the cavities are air-filled cavities.

According to an embodiment of any paragraph(s) of this summary, the cavities are solid-dielectric-material-filled cavities.

According to an embodiment of any paragraph(s) of this summary, the cavities are polymer-filled cavities.

According to an embodiment of any paragraph(s) of this summary, the perforations are in an equilateral-triangle-spaced grid.

According to an embodiment of any paragraph(s) of this summary, the wavefront transformer further includes a dielectric material cover overlying substrate and the perforations.

According to an embodiment of any paragraph(s) of this summary, the dielectric material cover includes protrusions that enter into respective of the perforations.

According to an embodiment of any paragraph(s) of this summary, the protrusions fill the respective of the perforations.

According to an embodiment of any paragraph(s) of this summary, the dielectric material cover is made of a polymer.

According to an embodiment of any paragraph(s) of this summary, the dielectric material cover is made of polyethylene or polytetrafluoroethylene (PTFE).

According to another aspect, a wavefront transformer for transforming an incident electromagnetic wavefront having a given shape to a reflected wavefront having a different shape, the wavefront transformer including: a substrate having a conductive surface for reflecting the incident electromagnetic wavefront, the incident electromagnetic wavefront having one or more intended incident frequencies; wherein the substrate has spaced perforations, each of the perforations having substantially the same radius; wherein the perforations have varying depths, with the depths of the perforations configured to impose a desired transformation on the incident electromagnetic wavefront; and wherein the perforations are filled with a solid dielectric material.

According to an embodiment of any paragraph(s) of this summary, the solid dielectric material filling the perforations are protrusions that are parts of a dielectric material cover that covers the substrate.

According to an embodiment of any paragraph(s) of this summary, the solid dielectric material is high-density polyethylene (HDPE).

According to still another aspect, a wavefront transformer for transforming an incident electromagnetic wavefront having a given shape to a reflected wavefront having a different shape, the wavefront transformer including: a substrate having a conductive surface for reflecting the incident electromagnetic wavefront, the incident electromagnetic wavefront having one or more intended incident frequencies; wherein the substrate has spaced perforations; wherein the perforations are configured to impose a desired transformation on the incident electromagnetic wavefront; and a cover overlying the substrate and covering the perforations.

According to an embodiment of any paragraph(s) of this summary, the cover is made of a dielectric material.

According to an embodiment of any paragraph(s) of this summary, the cover is made of high-density polyethylene (HDPE).

According to an embodiment of any paragraph(s) of this summary, the cover is made of polyurethane.

According to an embodiment of any paragraph(s) of this summary, the cover is made of polytetrafluoroethylene (PTFE).

According to an embodiment of any paragraph(s) of this summary, the cover has a thickness of 10 mils or less.

According to an embodiment of any paragraph(s) of this summary, the cover has a thickness of 5 mils or less.

According to another aspect, a method of making a wavefront transformer having a substrate with perforations therein, the wavefront transformer for transforming an incident electromagnetic wavefront having a given shape to a reflected wavefront having a different shape, the method including: forming a non-conductive plate with protrusions thereupon; using the plate to form a substrate with perforations therein corresponding to the protrusions on the plate; forming a conductive surface on the substrate to reflect the incident wavefront; wherein the perforations are configured to impose a desired transformation on the incident electromagnetic wavefront.

According to an embodiment of any paragraph(s) of this summary, the forming of the conductive surface includes depositing conductive material on the plate and the protrusions, before forming the substrate.

According to an embodiment of any paragraph(s) of this summary, the plate is left in place as part of the wavefront transformer.

According to an embodiment of any paragraph(s) of this summary, the depositing of the conductive material includes electroplating the conductive material.

According to an embodiment of any paragraph(s) of this summary, the depositing of the conductive material includes electroforming the conductive material.

According to an embodiment of any paragraph(s) of this summary, the method further includes removing the plate after formation of the substrate with the perforations.

According to an embodiment of any paragraph(s) of this summary, the method further includes depositing the conductive material on the substrate, after removing the plate.

According to still another aspect, a wavefront transformer for transforming an incident electromagnetic wavefront having a given shape to a reflected wavefront having a different shape, the wavefront transformer including a substrate having a conductive surface for reflecting the incident electromagnetic wavefront, the incident electromagnetic wavefront having one or more intended incident frequencies; wherein the substrate has spaced perforations; wherein the perforations have varying dimensions and/or spacings, with the varying dimensions and/or spacings of the perforations configured to focus the incident electromagnetic wavefront; and wherein the perforations are filled with a solid dielectric material.

According to an embodiment of any paragraph(s) of this summary, the solid dielectric material also overlies the conductive surface.

According to an embodiment of any paragraph(s) of this summary, the perforations have varying cross-sectional dimensions and/or depths.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

Figure 1A:
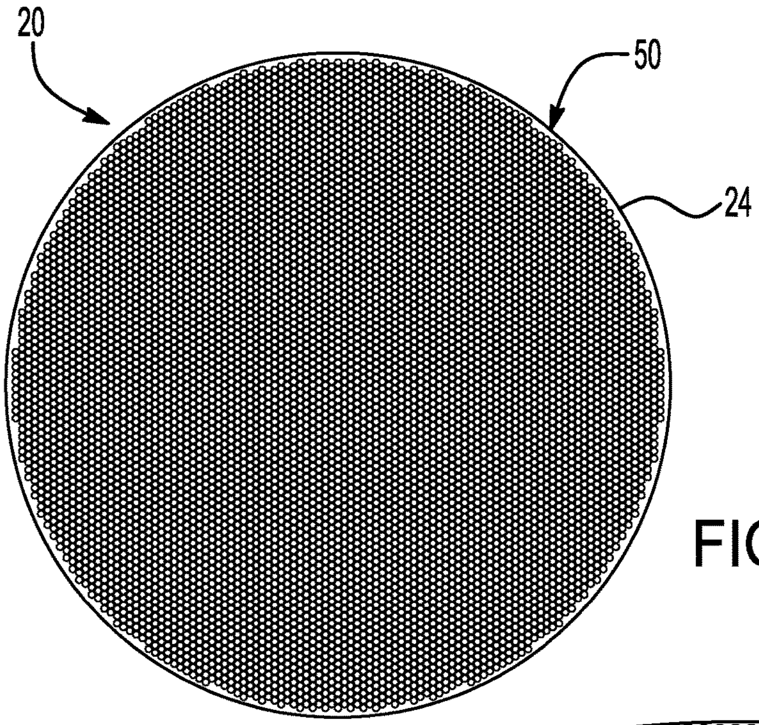
FIG. 1A is a plan view of a wavefront transformer according to an embodiment.
Figure 1B:
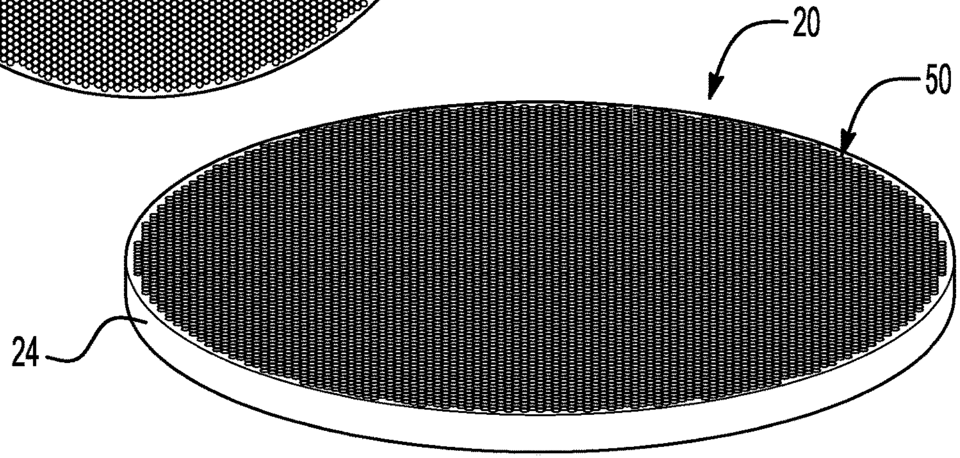
FIG. 1B is an oblique view of the wavefront transformer of FIG. 1A.
Figure 2:
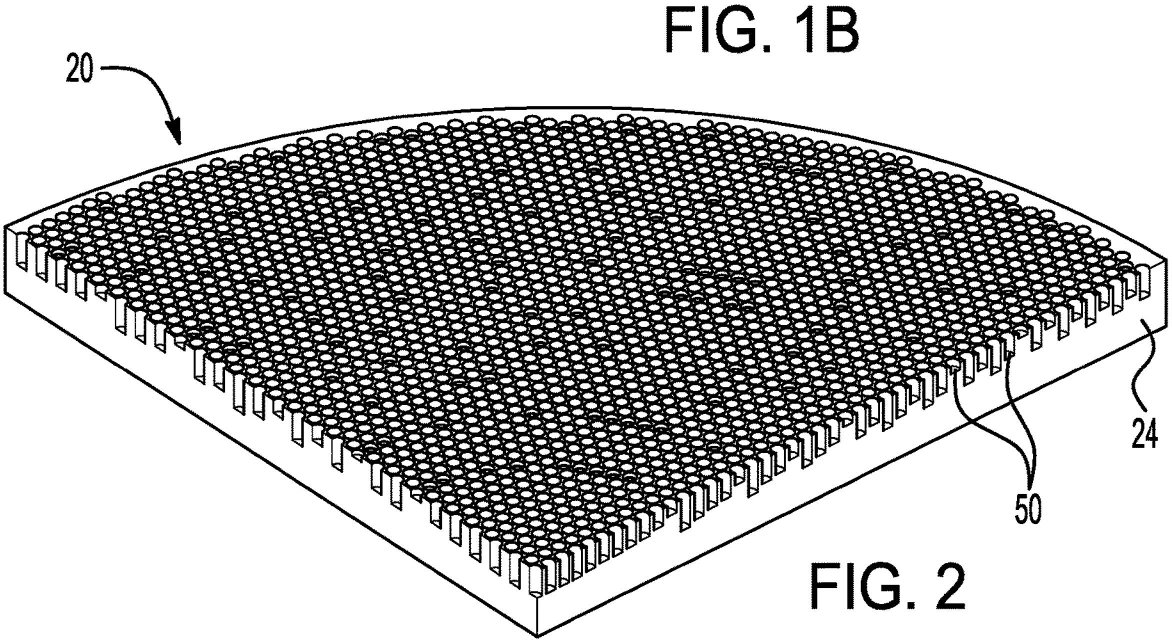
FIG. 2 is an oblique view of a section of the wavefront transformer of FIG. 1A.
Figure 3:
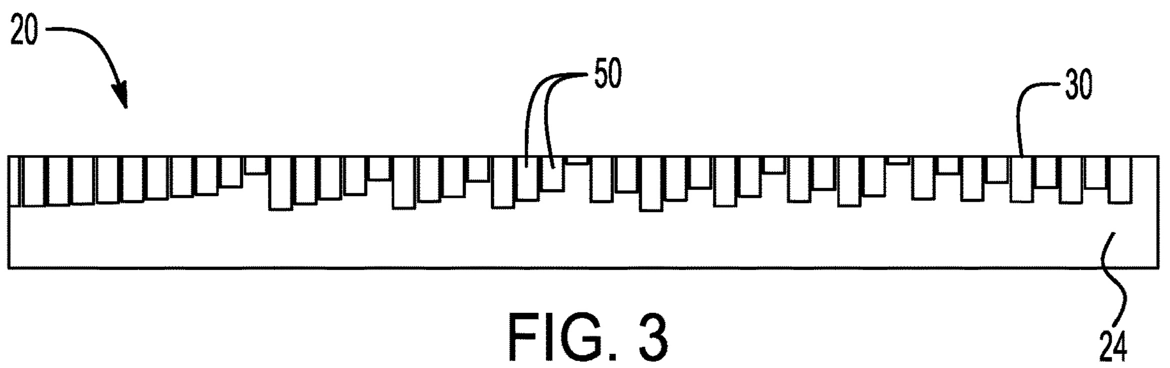
FIG. 3 is a cross-sectional view of part of the wavefront transformer of FIG. 1A.

A wavefront transformer for reflecting and transforming an incident electromagnetic wavefront includes an electrically-conductive substrate with spaced perforations (cavities), which may have uniform spacing and varying depth. The perforations may have a radius that is close to and greater than a cutoff radius for one or more intended incident frequencies of the incident wavefront. The spaced perforations may be filled with air or may be filled with a dielectric solid material. The substrate may be covered with a cover made of a dielectric solid material. The transformer may be made by drilling holes in the substrate. Alternatively, a plate having protrusions on it corresponding to the desired perforations may be used to form the perforations on the substrate. The plate may be removed or left in place after the formation of the perforations.

FIGS. 1A-3 show a wavefront transformer (reflector plate) 20 having a reflecting surface 30 that reflects incident electromagnetic energy. The wavefront transformer 20 may be part of an antenna, for example with a waveguide feed positioned at a focal point of the reflector plate 20 to emit or receive an electromagnetic signal. In a receive mode, electromagnetic energy incident on the surface of the reflector plate 20 is reflected toward the focal point where it is collected by the waveguide feed. In a transmit mode, electromagnetic energy from the waveguide feed illuminates the surface of the reflector plate 20 and is reflected outward with respect to the bore axis of the reflector plate.

The wavefront transformer 20 may be a metal plate (or a metal-plated substrate) with a substantially flat conductive reflecting surface 30. The wavefront transformer (reflector plate) 20 may be formed of any structurally suitable material that supports a conductive material on the surface to reflect incident electromagnetic energy. The surfaces that will be exposed to electromagnetic fields should be of high electrical conductivity. Example materials include aluminum, copper, silver, and gold. Metals like copper and silver that are prone to tarnishing or corrosion may undergo suitable surface treatment prior to use. High-strength metals (useful if wavefront transformer is to be a load-bearing or armor element) having lower electrical conductivity (such as stainless steel) can also be used by plating all exposed surfaces with a thin layer of a high-conductivity metal such as gold. A substrate 24 of the wavefront transformer 20 may itself be a reflecting material, or may be a material that supports the reflecting material. Additionally, the reflector plate may have any shape, including a plate having a constant, variable or irregular thickness. As an example, the reflector plate may be conformal to a non-flat surface of a larger device or structure, for example conforming to a cylindrical surface of a fuselage of an aircraft or other flight vehicle. The conductive surface has a plurality of openings (perforations) 50 that are spaced to form an array extending across the reflector plate. The openings extend through the surface of the plate to form discrete, unconnected slots or cavities.

In the illustrated embodiment, the wavefront transformer (reflector plate) 20 is a perforated plate having a plurality of holes, for example of varying depth, forming the opening and side surfaces of perforations, for example cavities or holes, 50. The resulting array of cavities may be any of a wide variety of diameters, such as about 4 inches (about 10.2 cm), about 6 inches (about 15.2 cm), or about 8 inches (20.3 cm) in diameter. The overall diameter of the wavefront transformer 20 may be slightly larger than the array of cavities.

The wavefront transformer (reflector plate) 20 transforms an incident electromagnetic wavefront of a given shape into a reflected wavefront having a different shape, the wavefront generally being a surface of constant phase. For example, the reflector can transform an incident plane wave into a spherical wave.

The perforations 50 in the conductive surface impose a local phase shift on a reflected electromagnetic wave. The phase of the electromagnetic wave reflected from a portion of the reflector as it arrives at the focal point is the sum of the local phase shift determined by the geometry and size of the cavity, and a propagation phase shift determined by the distance from the cavity to the focal point. The antenna provided by the present disclosure approximates the performance of a curved reflecting antenna through proper variation of the cavity dimensions and/or spacing between adjacent cavities with respect to position on the reflecting surface relative to the desired focal point.

The local phase shift imposed by a particular perforation is dependent on the shape and dimensions (including volume, depth and cross-sectional dimensions or size) of the cavity, and its spacing relative to neighboring cavities. If the shape and spacing are substantially uniform across the reflector, for example, proper variation of one or more of the dimensions of the cavities, such as the depth or the cross-sectional size, provides the desired local phase shift.

In a particular embodiment, such as the illustrated embodiment, the spacing of the perforations 50 may be substantially uniform. The perforations 50 may form an array that is an equilateral-triangle-spaced grid.

The perforations 50 may all have substantially the same radius, and may have varying depth. The radius for the perforations may be selected to be relative to a cutoff radius, a radius for which a waveguide phase propagation constant of the intended incident frequency, for example one frequency of a range of frequencies, is zero. The cutoff frequency in a circular waveguide of radius a is $1.8412c/(2\pi\alpha\sqrt{\varepsilon_R})$, where c is the speed of light in vacuum and ER is the relative dielectric constant of the material filling the waveguide ($\varepsilon_R=1$ for vacuum). Conversely, for an incident frequency f, cutoff occurs when the waveguide radius is $\alpha_c=1.8412c/(2\pi f\sqrt{\varepsilon_R})$. For example, the radius may be within 10%, 15%, 20%, or 25% of the cutoff radius, for example being 100% to 110% of the cutoff radius, 100% to 115% of the cutoff radius, 100% to 120% of the cutoff radius, or 100% to 125% of the cutoff radius.

Figure 4A:
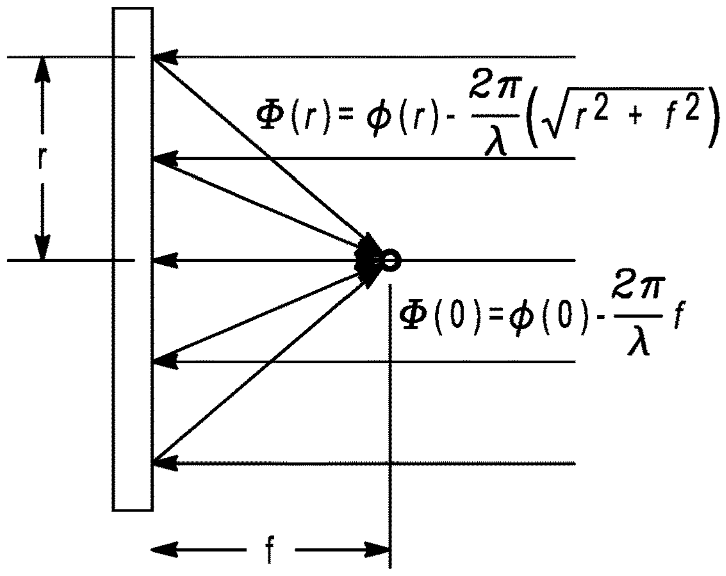
FIG. 4A is an illustration for calculations involving a wavefront transformer.

A plane wave traveling along the axis of a center-fed parabolic reflector is transformed upon reflection into a spherical wavefront which converges on the focal point. From a geometrical optics viewpoint, rays traveling parallel to the reflector axis are reflected towards the focal point by the curved surface and arrive at the focal point with equal phases, having traveled equal distances. However, for a plane wave incident on a flat plate (as shown in FIG. 4A), the reflected rays travel unequal path lengths to reach the focal point and thus have differing propagation phase shifts. Rather than equalizing the path lengths, the present disclosure provides a reflector plate 20 with cavities 50 that impart local phase shifts on the reflected rays so that despite the different path lengths of the reflected rays, they arrive at the focal point in phase.

In combination with the phase shift imparted as a result of path length differences from individual cavities to the focal point, the local phase shift is selected to place the reflected waves in phase at the focal point so that they add, creating a strong and clear signal. The reflector can thus emulate a curved reflector.

In the illustrated embodiment, cylindrical perforations are arranged to form an equilateral triangular array of circular openings in the surface of the plate, providing certain advantages in cost and ease of fabrication. The local phase shift imposed on an electromagnetic wave reflected from such a structure depends primarily on the local perforation size, in this case the depth. An equilateral triangular arrangement also provides phase shifts that are nearly identical for any polarization, or combination of polarizations.

To further illustrate the principles that govern the operation of the antenna, consider that the illustrated exemplary reflector plate is a flat, center-fed reflector plate having a focal point at a focal length of f. (The letter f is used herein for both frequency and focal length in different contexts, but the two (focal length and frequency) are not the same, nor are they directly related.) The focal length is a distance along a perpendicular axis from the reflecting surface to the focal point and may coincide with the bore axis of the reflector plate. In the illustrated embodiment, the perpendicular axis (in this case the center axis) from the surface to the focal point passes through the center of the reflecting surface. (To facilitate the description, references herein to the center refer to the position of the center axis, although the focal point need not lie on a perpendicular axis passing through the geometric center of the plate.)

The rays shown in FIG. 4A represent a plane wave normally incident on such a flat reflecting surface. When the sum of the local phase shift imposed by a perforation on the reflected wave and the phase shift due to propagation from the reflecting surface to the focal point is independent of r (within a multiple of 2π radians), where r is a distance to a particular perforation measured along a perpendicular to the center axis, waves reflected from different parts of the reflector plate add in phase at the focal point.

Mathematically, this means that:

$$\Phi(r)=\phi(r)-\frac{2\pi}{\lambda}\left(\sqrt{r^2+f^2}\right) \tag{1}$$

where ϕ(r) is the local phase shift imposed by the flat reflecting surface at a distance r from the axis, and ϕ(r) is the total phase shift at the focal point due to reflection from the surface and propagation from the surface to the focal point, with f being the distance from the plate to the focal point (the focal length). To mimic a center-fed parabolic reflector, ϕ(r) is advantageously independent of r, which requires that:

$$\phi(r)=C+\frac{2\pi}{\lambda}\left(\sqrt{r^2+f^2}\right) \tag{2}$$

where C is an arbitrary constant. The constant C may conveniently be assigned the value $\phi(0)-2\pi f/\lambda$, for example, so that φ(r) assumes the form:

$$\phi(r)=\phi(0)+\frac{2\pi}{\lambda}\left(\sqrt{r^2+f^2}-f\right) \tag{3}$$

Given the wavelength λ and the focal length f, the design of the reflector plate is determined by the value of ϕ(0), where ϕ(0) represents the phase shift imposed on an electromagnetic wave reflected from the center of the reflecting surface and is determined by the dimensions of the cavity at the center of the reflector plate, i.e., d(0,0), the depth of the cavity at the center of the reflector plate.

A center-fed reflector having a focal length of f can be synthesized by choosing a suitable radius common to all cavities and by varying the cavity depth d(x,y) with position r(x,y) in such a way that the total phase shift imposed by the cavity located at position r(x,y) is ϕ(r). The configuration of the plate then is determined by choosing a depth for the cavity at the center of the plate, which determines ϕ(0), the total phase shift imposed by the cavity located at position r(0,0). The depths of the remaining cavities are then chosen to satisfy Equation (3) within a multiple of 2π radians (360°).

However, because of the interaction of the fields scattered by neighboring cavities, the dimensions of a single perforation (cavity) are not calculated in isolation. Rather, the varying property (such as the size and/or depth) of a particular perforation is approximated by assuming that the perforation is part of an infinite periodic array of identical perforations.

Figure 4B:
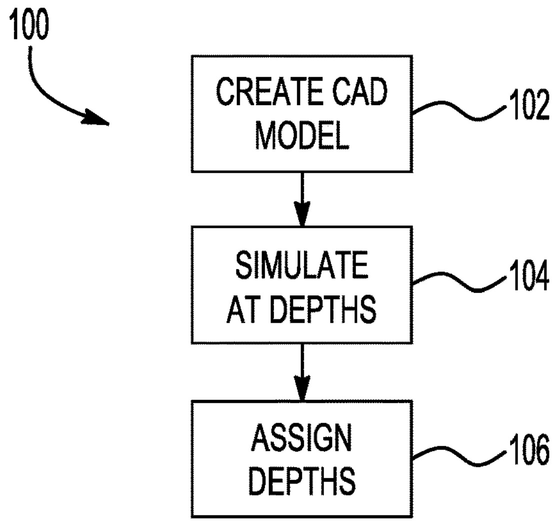
FIG. 4B is a high-level flowchart of a method for configuring a waveform transformer, such as the waveform transformer of FIG. 1A.

FIG. 4B shows a high-level flowchart of a method 100 for configuring a reflector plate like the reflector plate 20 (FIG. 1A). In step 102 a CAD model is created of a single cavity that is part of an infinite periodic array of identical perforations. Mutual coupling with nearby perforations is accounted for with periodic boundary conditions that terminate the boundaries of the unit cell.

In step 104 a finite-element simulation is performed of the unit cell over a pre-selected range of cavity depths. From the results, the phase shift imposed on the reflected wave for each cavity depth may be calculated.

In step 106 depths are assigned to the various cavities of the reflector plate. The calculated phase-shift vs. cavity depth data from the prior steps forms a look-up table that is used to assign depths to cavities as a function of cavity position r(x,y). The depth of the cavity at any position is chosen to yield the phase closest to that prescribed by Equation (3), within a multiple of 2π. More generally, the cavity depth at any position is chosen to yield the phase closest to that of the prescribed/desired phase profile, in this case that given by Equation (3). The depth of the cavity at the center r(0,0) is chosen to minimize the root-mean-square (rms) difference between the ideal phases from Equation (3) and the actual phases. Every other cavity depth is determined from the lookup table in sequence, and for the cavities the rms phase error may be approximately calculated. In the end, the center cavity depth may be chosen to minimize this rms phase error.

Figure 5:
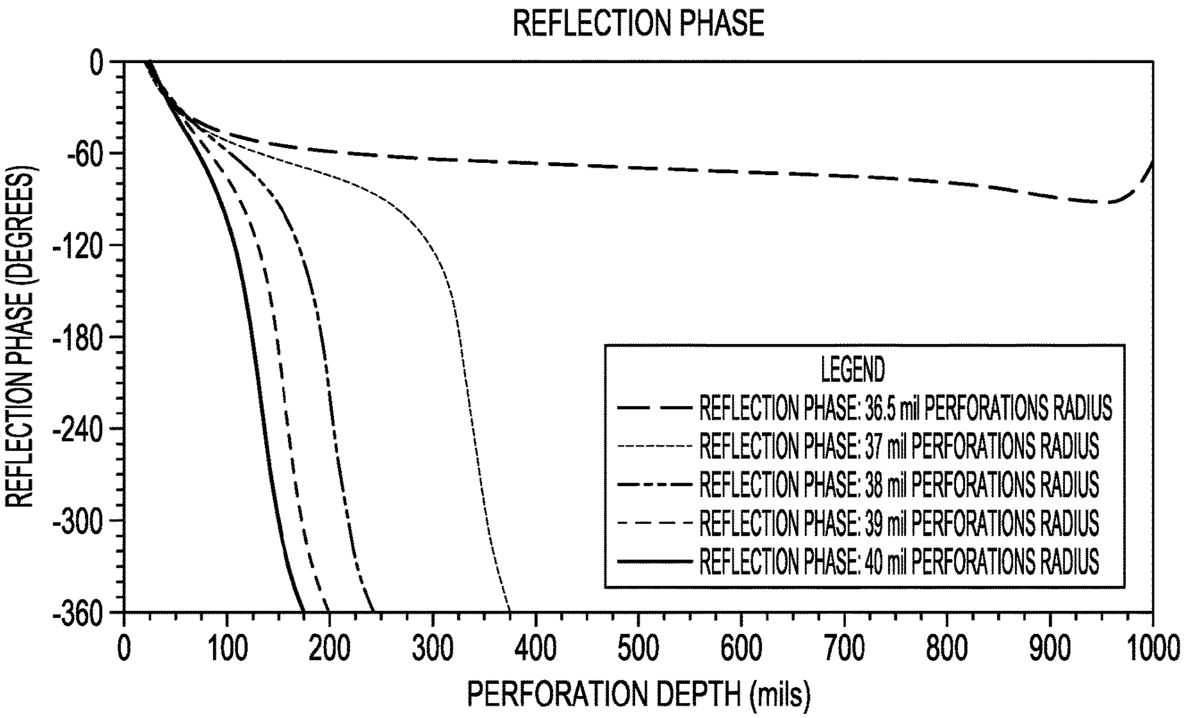
FIG. 5 is a graph of reflection phase vs. perforation depth for different cavity (perforation) radii.

FIG. 5 shows reflected-wave phase shift as a function of perforation depth for a series of different perforation radii, from a 36.5 mil perforation radius to a 40 mil perforation radius, for normally-incident 95 GHz radiation. The circular waveguide cutoff occurs when $a_c$=36.4 mils. As the perforation size is reduced the maximum perforation depth required to achieve 360° reflection phase increases rapidly. Near cutoff (frequency f approaches a critical frequency $f_c$, and/or perforation radius a approaches cutoff radius $a_c$) the waveguide propagation constant β, given by:

$$\beta = \frac{2\pi}{\lambda_0}\sqrt{1 - \frac{f_C^2}{f^2}} \tag{4}$$

approaches zero, explaining the sharp increase in required hole depth. The critical frequency $f_c$ may be found from the relation:

$$f_C = 1.8412c/2\pi a \tag{5}$$

Equation (5) shows the relationship assuming that the perforation is empty—a more general relationship is given earlier.

Figure 6:
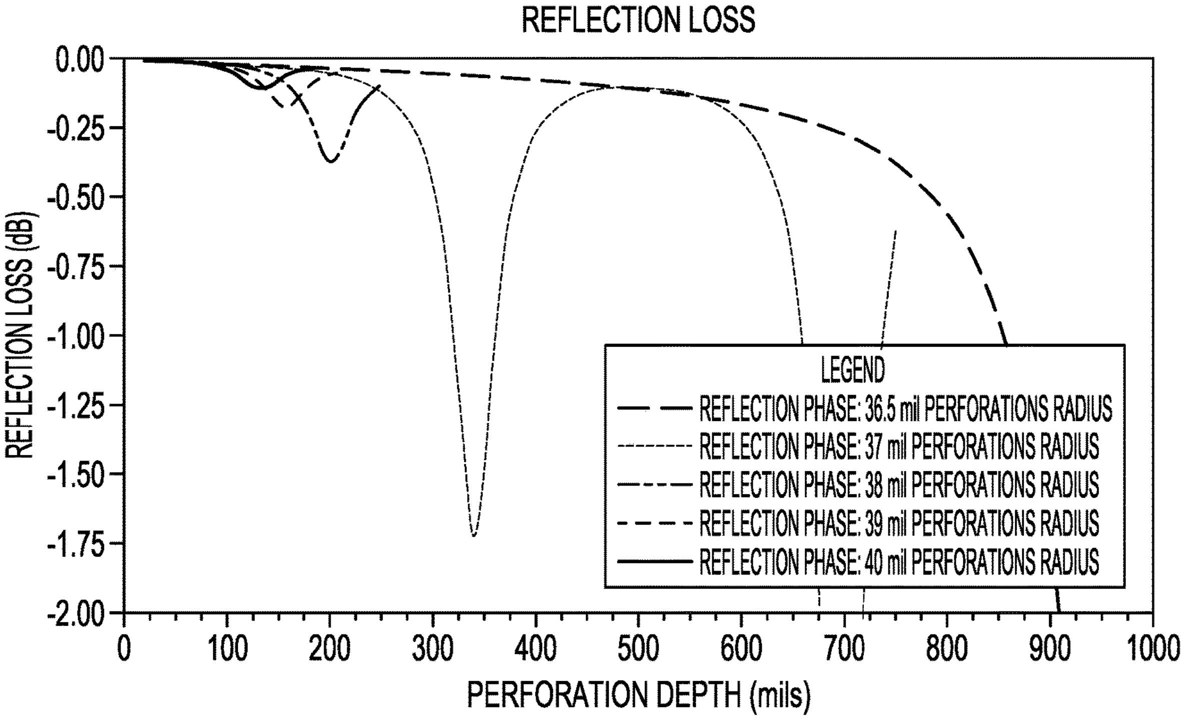
FIG. 6 is a graph of reflection loss vs. perforation depth for different cavity (perforation) radii.

Finite conductivity losses also rise sharply as perforation size decreases, as illustrated in the graph shown in FIG. 6. Conversely, reflector directivity decreases as perforation diameter increases. Thus, it is desirable for the hole radius to be near, but not too close to, the cutoff radius.

Figure 7:
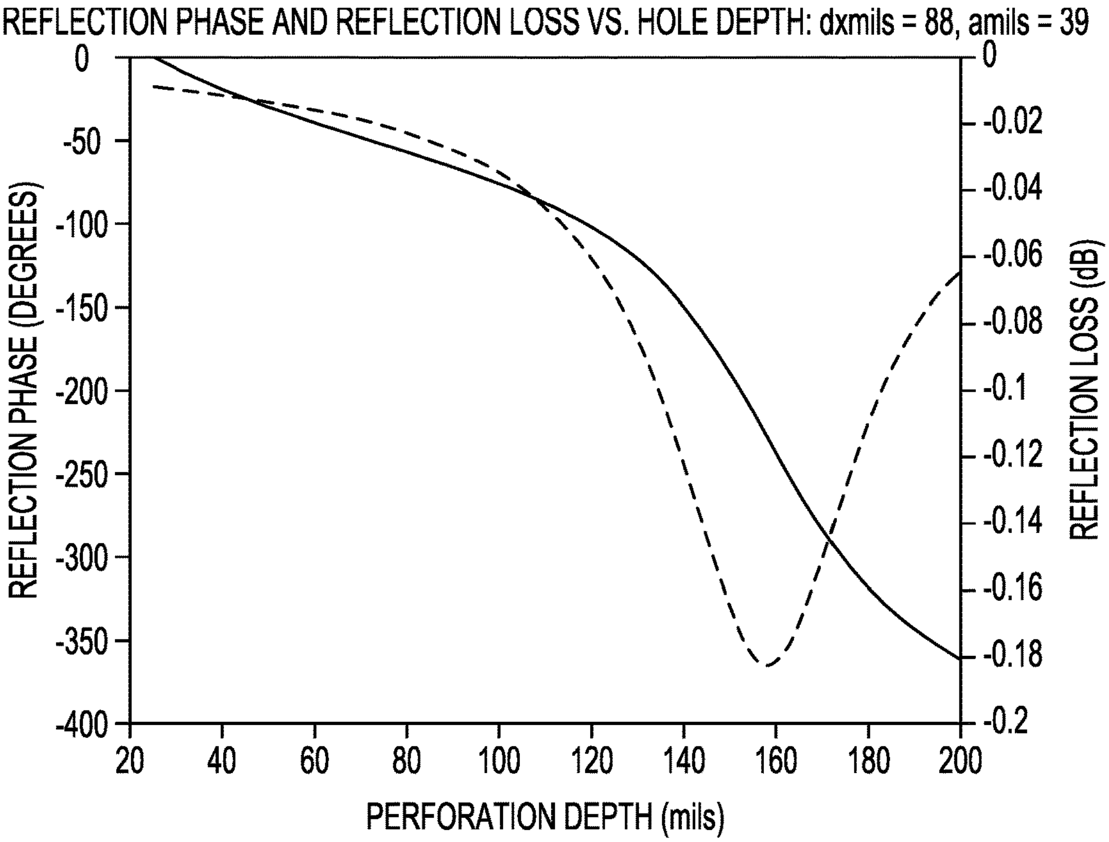
FIG. 7 is a graph of reflection phase and reflection loss vs. perforation depth for an embodiment of the wavefront transformer of FIG. 1A.
Figure 8:
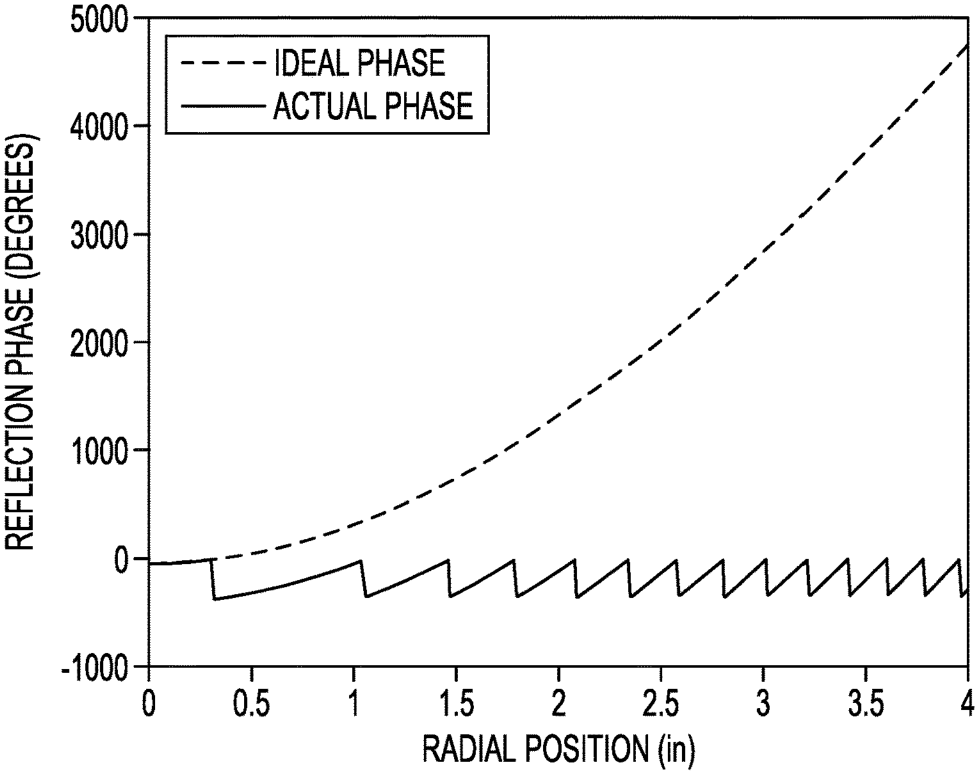
FIG. 8 is a graph of reflection phase vs. radial position for an embodiment of the wavefront transformer of FIG. 1A.
Figure 9:
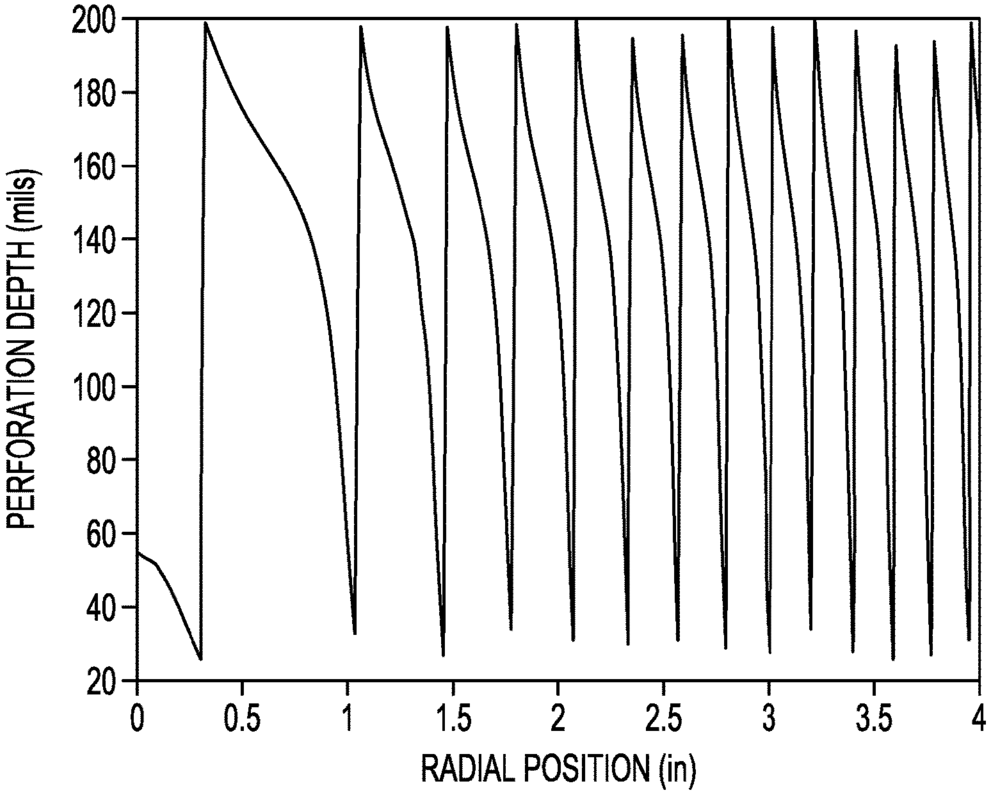
FIG. 9 is a graph of perforation depth vs. radial position for an embodiment of the wavefront transformer of FIG. 1A.

FIG. 7 is a graphical representation of a lookup table that may be used in configuring a wavefront transformer 20 for a particular condition, showing relationships between reflection phase and loss as functions of perforation depth. FIGS. 8 and 9 are plots of reflection phase and perforation depth vs. radial position for a reflector design based on FIG. 7. The situation for FIGS. 7-9 is that for a perforated reflector (wavefront transformer) with an equilateral triangular hole grid; an 8" OD for the grid, with 4" focal length; a 39 mil hole radius ($a_c$=36.4 mil at 95 GHZ); a 88 mil center-to-center perforation spacing; and a 199 mil maximum perforation depth.

Figure 10:
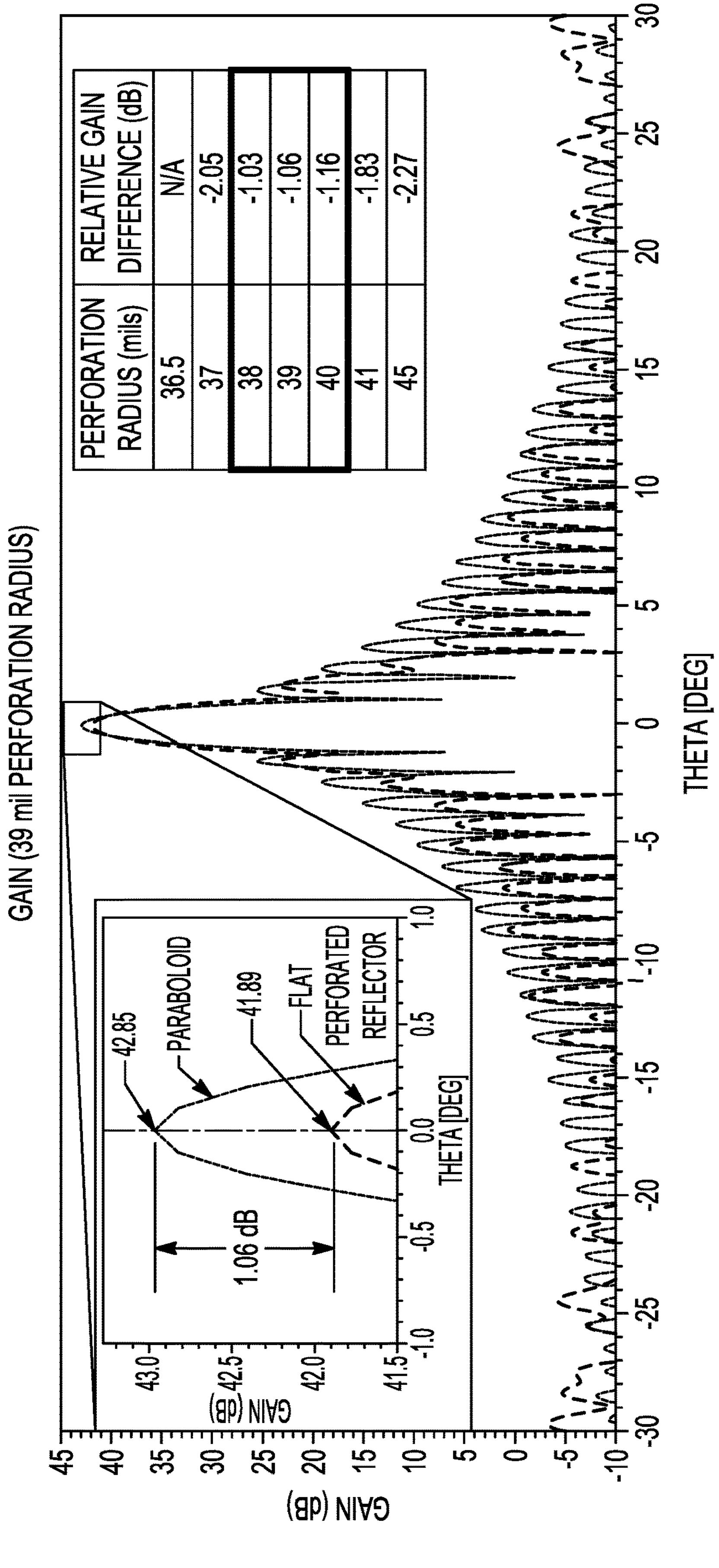
FIG. 10 is a graph comparing gain of an embodiment of the wavefront transformer of FIG. 1A with a parabolic reflector.

FIG. 10 shows a performance comparison of this configuration with a corresponding parabolic reflector. A chart showing the gain difference for different perforation radii is also shown. For a 39 mil perforation radius there is a 1.06 dB reduction in performance relative to the parabolic reflector, meaning that the flat wavefront transformer is nearly equal in gain to the parabolic reflector. The gain is similar for 38 mil perforations and 40 mil perforations, while higher and lower perforation radii result in higher losses, relative to a parabolic reflector.

From this it may be seen that it is desirable to have the selected perforation radius greater than the cutoff radius, but in a radius range close to the cutoff radius. For example, the perforations 50 may have a radius no greater than 25% above that of the cutoff radius, no greater than 20% above that of the cutoff radius, no greater than 15% above that of the cutoff radius, or no greater than 10% above that of the cutoff frequency, and/or may have a radius no greater than 5% above that of the cutoff radius, to give a few non-limiting possible bounds. It will be appreciated that the selected radius, which may be at or close to the most advantageous radius in terms of gain, may vary widely on variables of the situation, such as the frequency of the electromagnetic energy involved.

It will be understood that for a given frequency of operation, there is a range of cavity diameters that yield acceptable performance. The choice of "optimal" perforation diameter depends on performance requirements. In a very narrowband application (e.g., bandwidth is less than 1% of the center frequency), for example, one would choose the cavity diameter that maximizes gain at the center frequency. If moderate bandwidth (5% of the center frequency) is required, the cavity diameter may be chosen to yield acceptable performance at all frequencies within the desired bandwidth. This may require choosing a larger perforation diameter than in the narrowband case so that the frequencies at the low end of the operating band are sufficiently separated from cutoff.

Although the example described above regards 95 GHZ, the approach described above is applicable to a large range of other frequencies. For example, frequencies in the Ka-band (27-40 GHZ), V-band (40-75 GHZ), W-band (75-110 GHz), and G-band (110-300 GHz) may be used.

The wavefront transformers as disclosed herein may be useful in a wide variety of devices, such as antennas for receiving and/or transmitting signals. They may also be used in direct energy transmitters and/or receivers, as well as in other devices such as rectennas. Other possible uses include as components of wireless power transfer systems, nonlethal repel systems, high data rate communication systems, structural antennas, wireless power transmission, material processing, plasma heating for inertial confinement fusion, and terrestrial and satellite millimeter-wave communication.

The embodiments illustrated herein are but a few examples of a more general class of devices based on the technology described herein that can be used to transform an incident wavefront having a given shape to a reflected wavefront having a different shape, a wavefront being a surface of constant phase. The illustrated reflector transforms an incident planar wavefront into a reflected spherical wave that converges on the focal point in receive mode, and transforms a spherical wave into a reflected planar wavefront in transmit mode. Far more general wavefront transformations are possible with the present invention; for example, one can construct phase correcting mirrors for use in a beam waveguide system.

Figure 11:
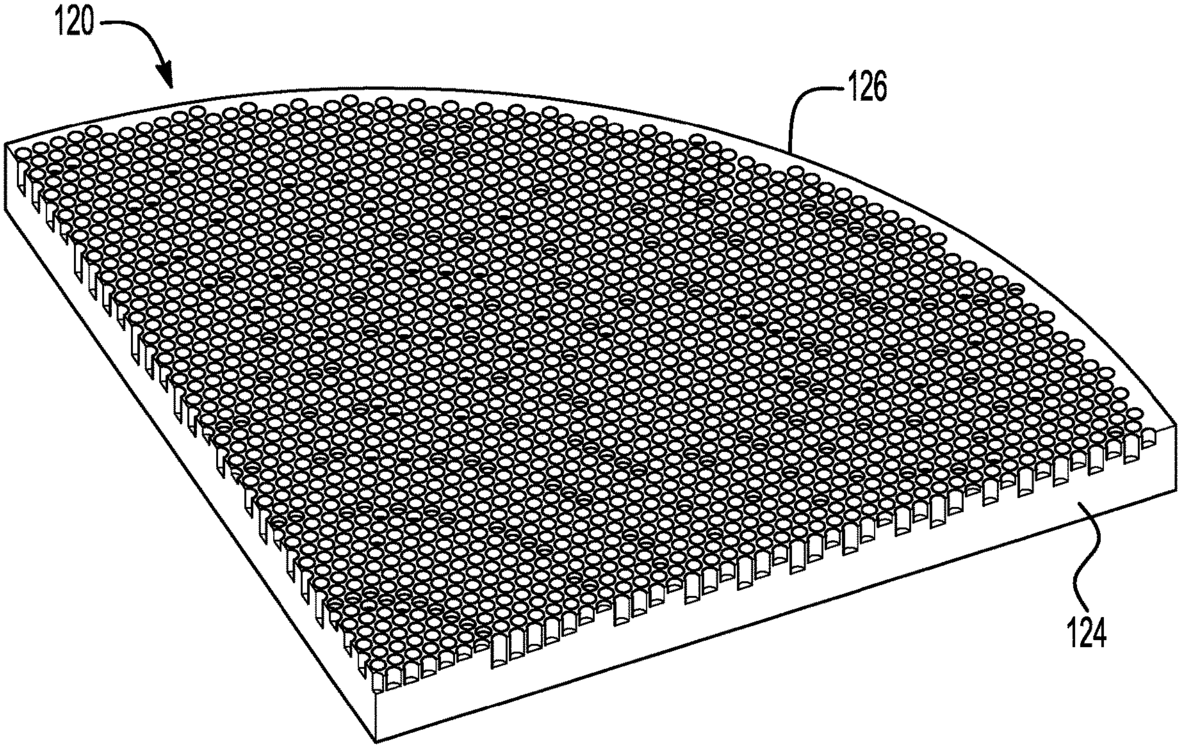
FIG. 11 is an oblique view of a section of a wavefront transformer according to an embodiment.
Figure 12:
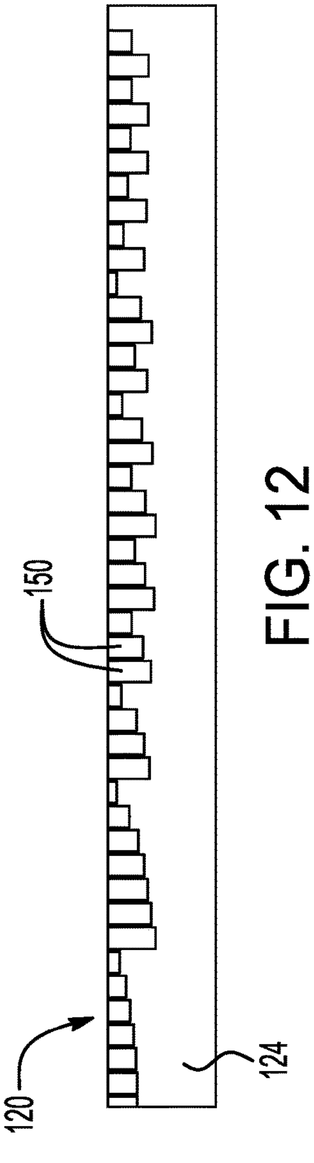
FIG. 12 is a cross-sectional view of the wavefront transformer of FIG. 11.
Figure 13:
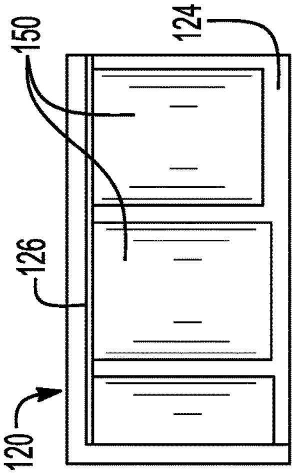
FIG. 13 is a magnified view of a portion of the view of FIG. 12.

FIGS. 11-13 show another embodiment, a wavefront transformer 120 that has a cover 126 covering perforations 150 in a substrate 124. The cover 126 may be a thin dielectric sheet, such as thin polymer material such as polyurethane, polyethylene (for example high-density polyethylene (HDPE)), or polytetrafluoroethylene (PTFE). The cover may have a thickness of 1-10 mils, of 1-5 mils, or of 2-4 mils. These are only example ranges, and it will be appreciated that the cover thickness is frequency dependent. A reflector operating at a lower frequency can tolerate a thicker cover.

The cover may prevent accumulation of dirt and/or moisture in the perforations (holes) 150. The material may be selected to have low loss tangents in the applicable frequencies, even at W-band.

Figure 14:
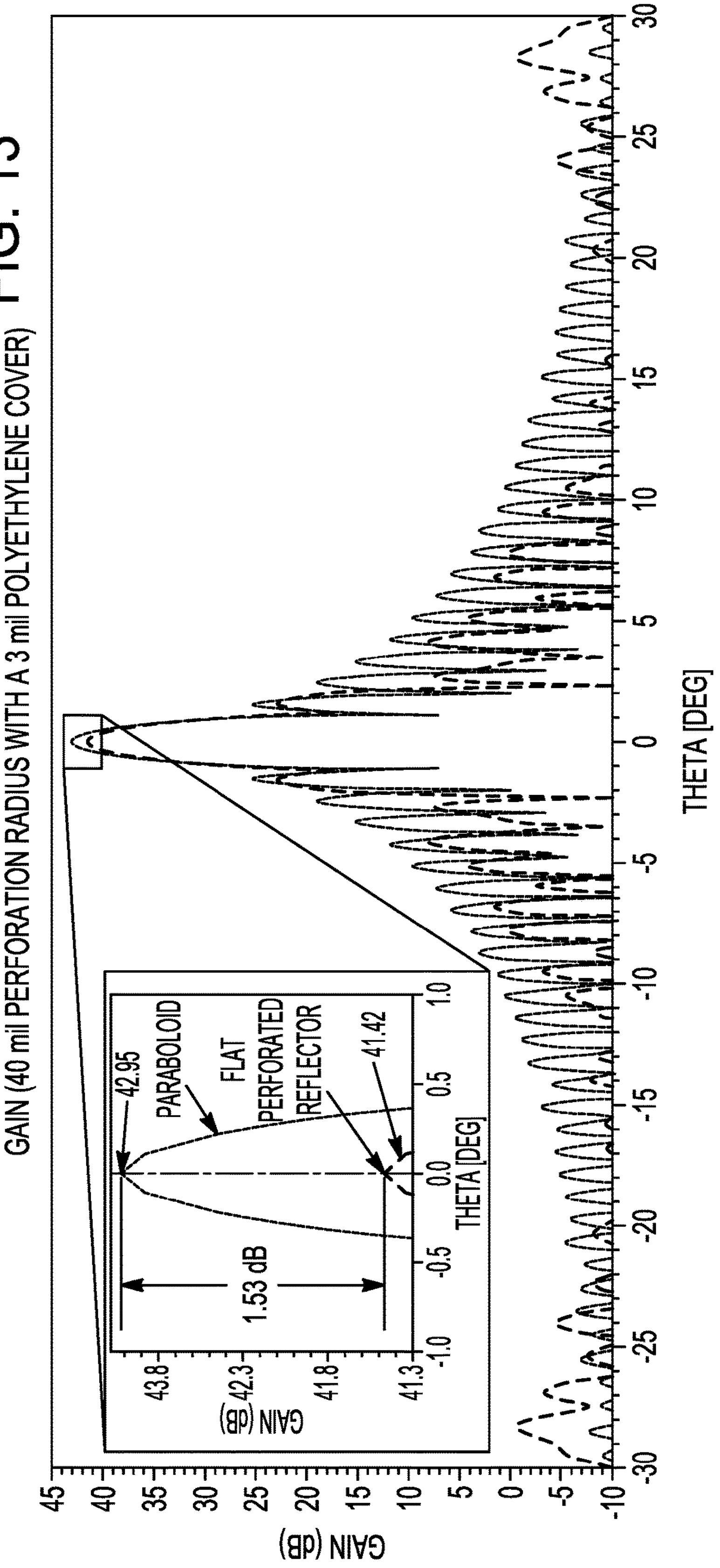
FIG. 14 is a graph comparing gain of an embodiment of the wavefront transformer of FIG. 11 with a parabolic reflector.

The embodiment illustrated in FIGS. 11-13 has a 40-mil hole radius, and a center-to-center distance of 90 mils between adjacent cavities 150. The reflector array diameter is 8 inches, and the maximum hole depth is 176 mils. FIG. 14 shows a performance comparison of this configuration to a corresponding parabolic configuration, showing a gain reduction of only 1.53 dB.

Although the illustrated embodiment has an array of circular openings of varying depth across the conductive surface, and the perforations have uniform radius and spacing, one or more other properties, such as perforation radius and/or spacing, could be varied to produce the desired local phase shifts. In addition, although the illustrated reflector is a geometrically flat plate, the reflector could have a regular or arbitrarily curved conductive surface that is perforated with appropriately selected cavities to compensate for errors in forming the curved surface, or to emulate a different shape, such as a semi-spherical surface emulating a hyperboloidal surface. Thus, the cover 126 may be combined with any of a wide variety of wavefront transformers, not limited to the embodiments illustrated in this application. Further wavefront transformer configurations are described in greater detail in co-owned U.S. Pat. No. 6,768,468 to Crouch, et al., which is incorporated herein by reference in its entirety.

Figure 15:
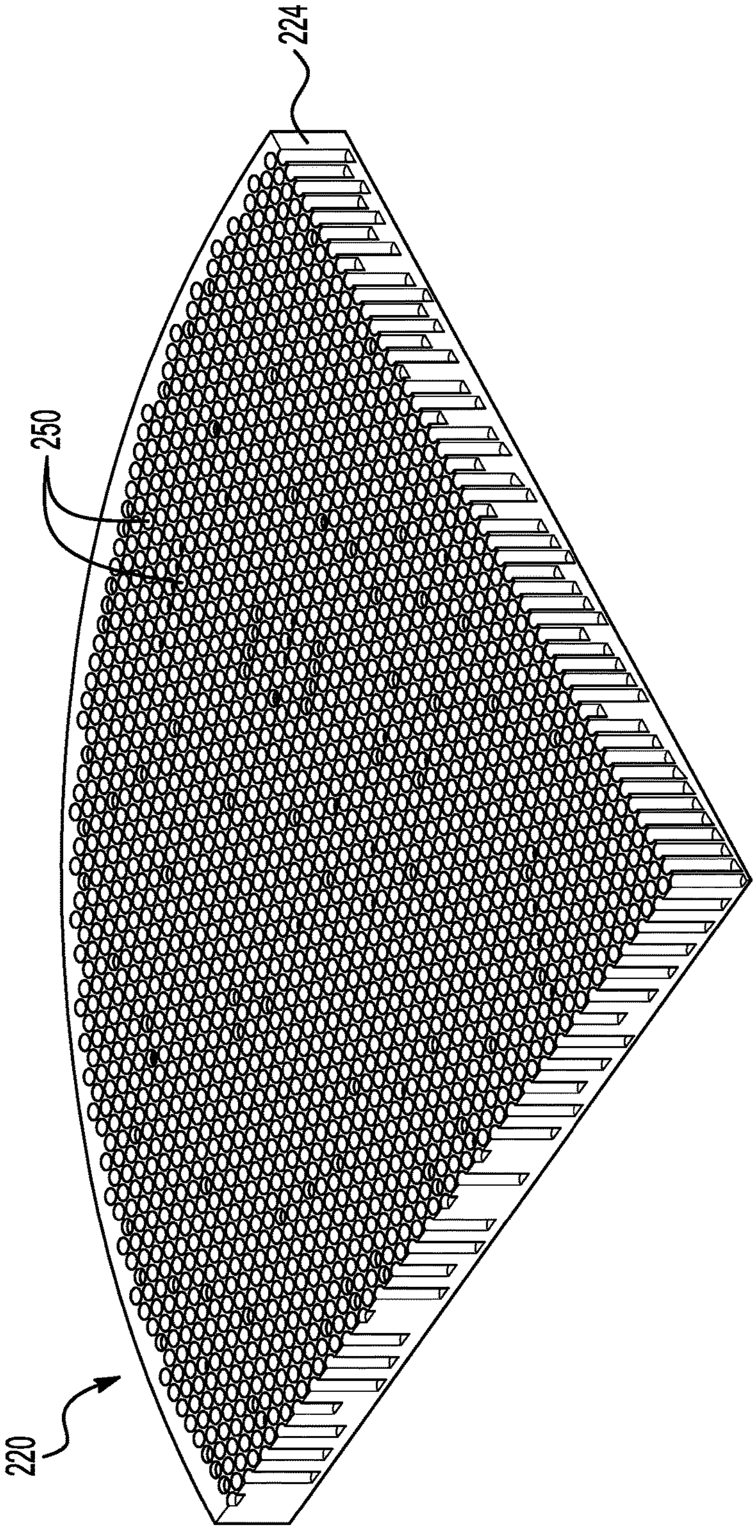
FIG. 15 is an oblique view of a section of a wavefront transformer according to an embodiment.
Figure 16:
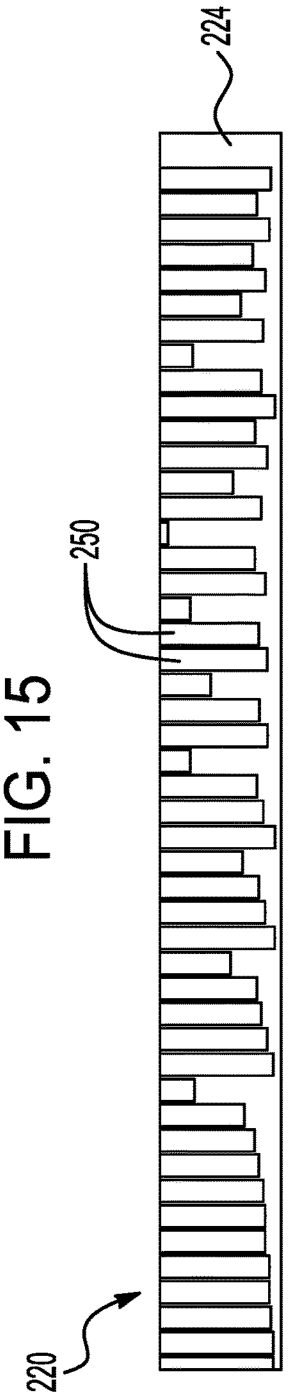
FIG. 16 is a cross-sectional view of the wavefront transformer of FIG. 15.
Figure 17:
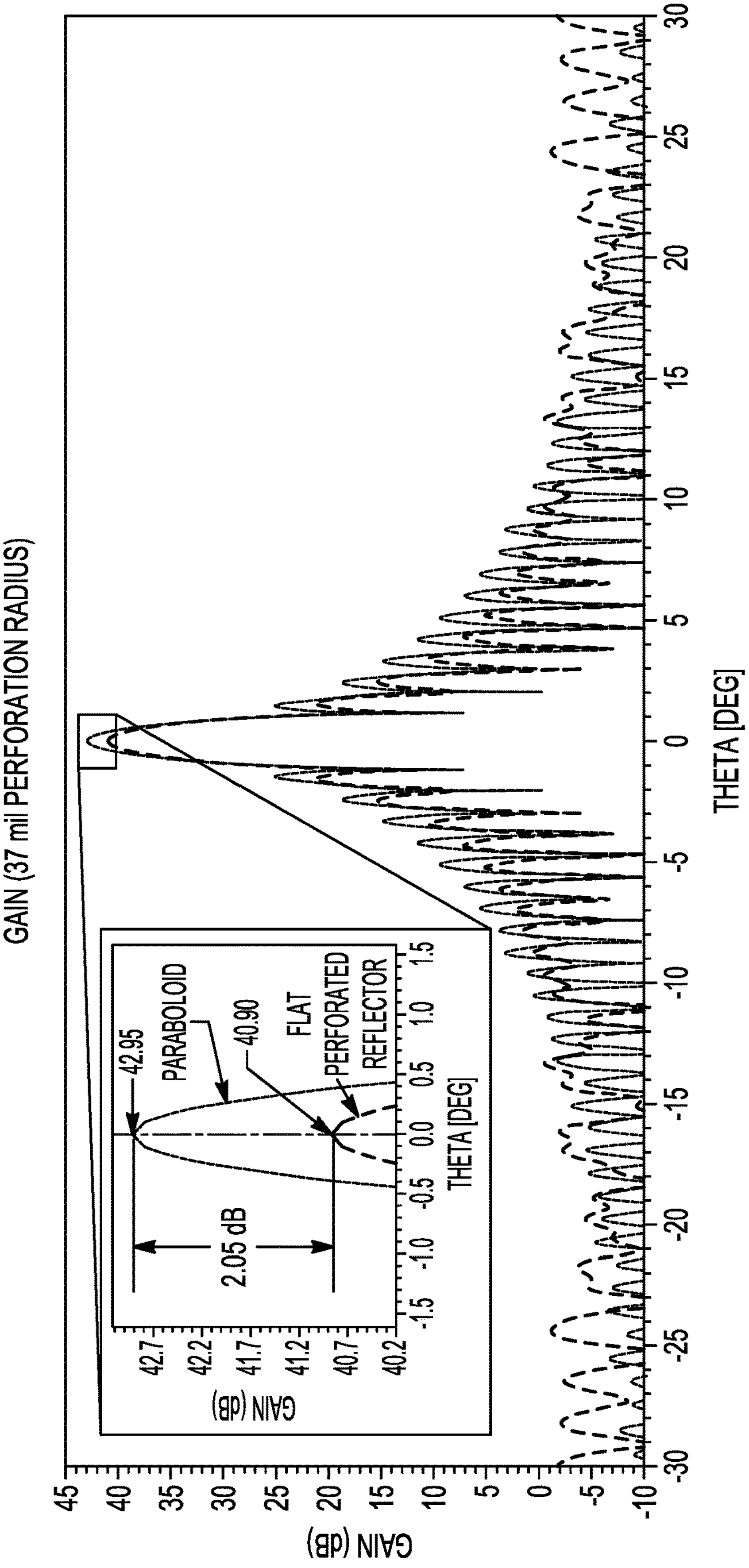
FIG. 17 is a graph comparing gain of an embodiment of the wavefront transformer of FIG. 15 with a parabolic reflector.

FIGS. 15 and 16 show another embodiment, a wavefront transformer (reflector) 220 having perforations 250 with a uniform 37 mil radius, in a substrate 224. The wavefront transformer 220 has an equilateral triangular hole grid, an 8" OD with a 4" focal length, 84 mil center-to-center perforation spacing, and a 380 mil maximum perforation depth. FIG. 17 shows a comparison of the gain with a parabolic reflector. Here there is a loss of 2.05 dB in gain. The greater reduction in gain, as well as the need for a thicker reflector (larger maximum cavity depth) indicate that this not an ideal radius for the cavities 250. There are excessive finite conductivity losses for perforations 37 mils and smaller.

Figure 18:
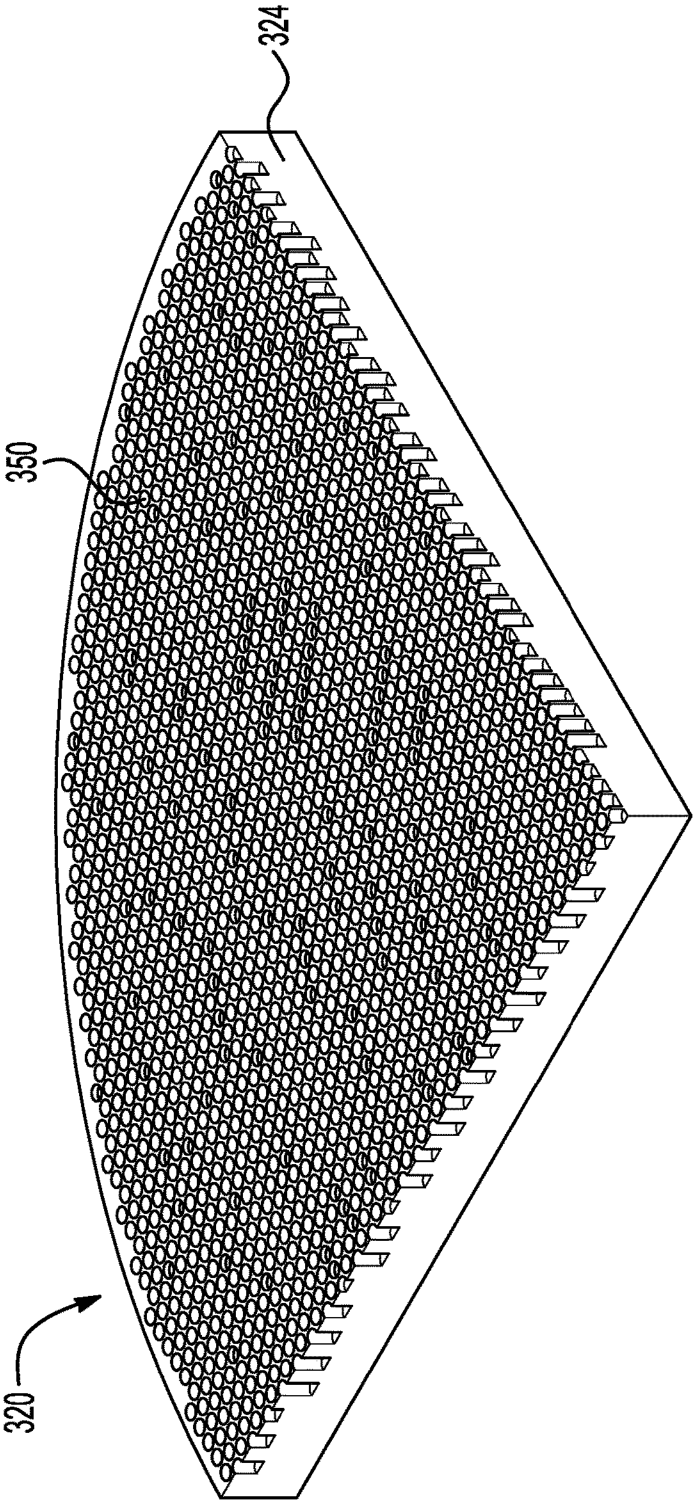
FIG. 18 is an oblique view of a section of a wavefront transformer according to an embodiment.
Figure 19:
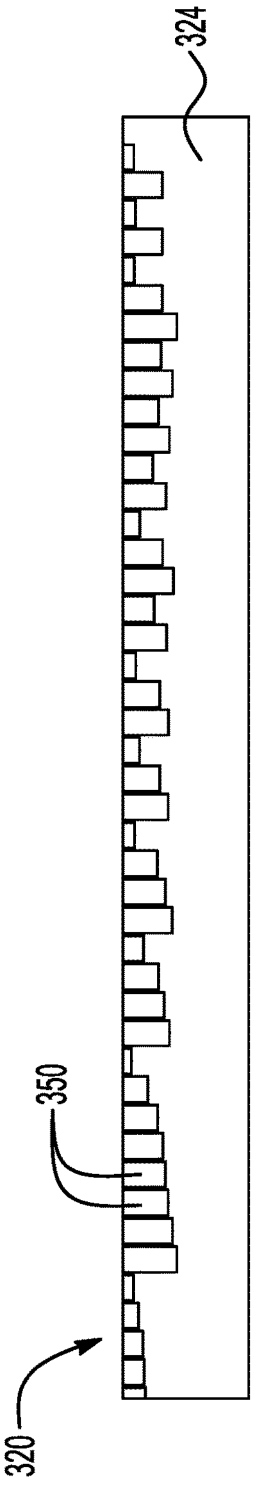
FIG. 19 is a cross-sectional view of the wavefront transformer of FIG. 18.
Figure 20:
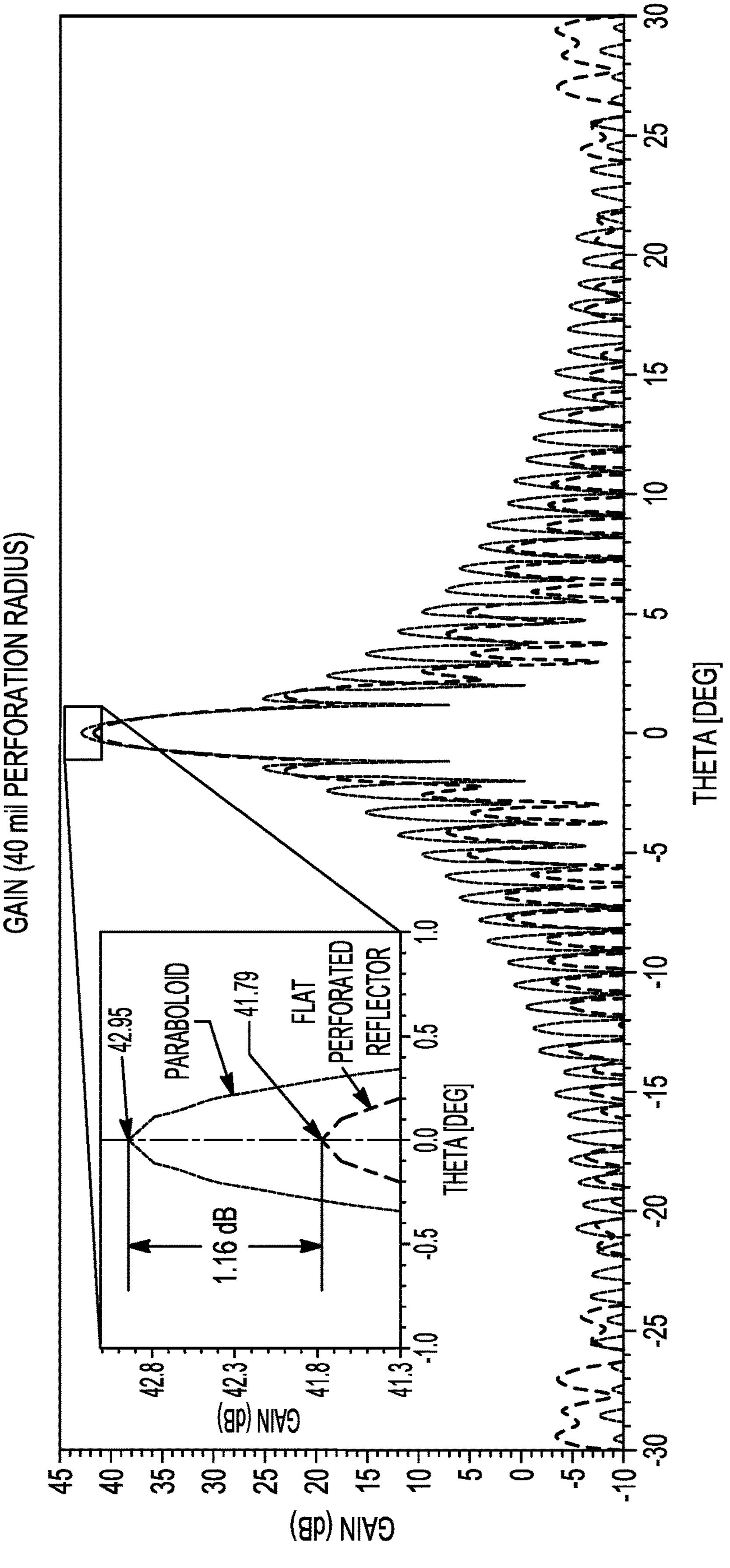
FIG. 20 is a graph comparing gain of an embodiment of the wavefront transformer of FIG. 18 with a parabolic reflector.

FIGS. 18 and 19 show another embodiment, a wavefront transformer (reflector) 320 having perforations 350 with a uniform 40 mil radius, in a substrate 324. The wavefront transformer 320 has an equilateral triangular hole grid, an 8" OD with a 4" focal length, 90 mil center-to-center perforation spacing, and a 175 mil maximum perforation depth. FIG. 20 shows a comparison of the gain with a parabolic reflector. Here there is a loss of 1.16 dB in gain. This configuration is markedly better, both in terms of gain and maximum depth, than the transformer 220 shown in FIGS. 15 and 16.

Figure 21:
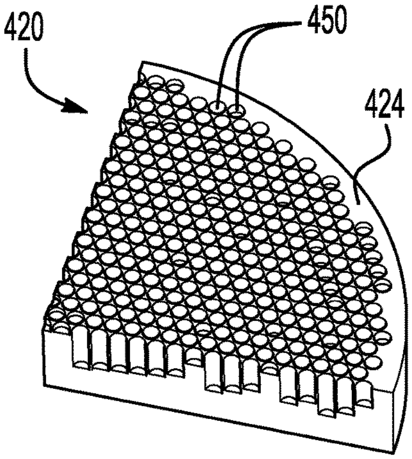
FIG. 21 is an oblique view of a section of a wavefront transformer according to an embodiment.

FIG. 21 shows still another embodiment, a wavefront transformer (reflector) 420. The transformer 420 has perforations 450 with a uniform 40 mil radius, in a substrate 424. It is smaller than the previous examples, with a 3" OD and a 2" focal length. It is configured for use with 95-GHz incident radiation. In an embodiment, the center-to-center spacing of the perforations 450 is 90 mils. As a practical minimum, the minimum spacing may be the perforation diameter plus about 10 mils, so as to leave a metal web of about 10 mils between adjacent perforations (cavities).

The metal web may be at least 10 mils and may be no greater than a value such as 12 mils, 15 mils, or 20 mils. The spacing between adjacent perforations may thus be hole diameter plus the web thickness, bounded by any of the amounts listed above. The width of the metal web separating holes is a constraint imposed by the fabrication method and mechanical stability considerations. Smaller is better from an RF perspective, but the separating web can only be made so thin. A reflecting plate configured for use at a lower frequency will have cavities that are deeper and larger in diameter, so a thicker web may be advantageous.

Figure 22:
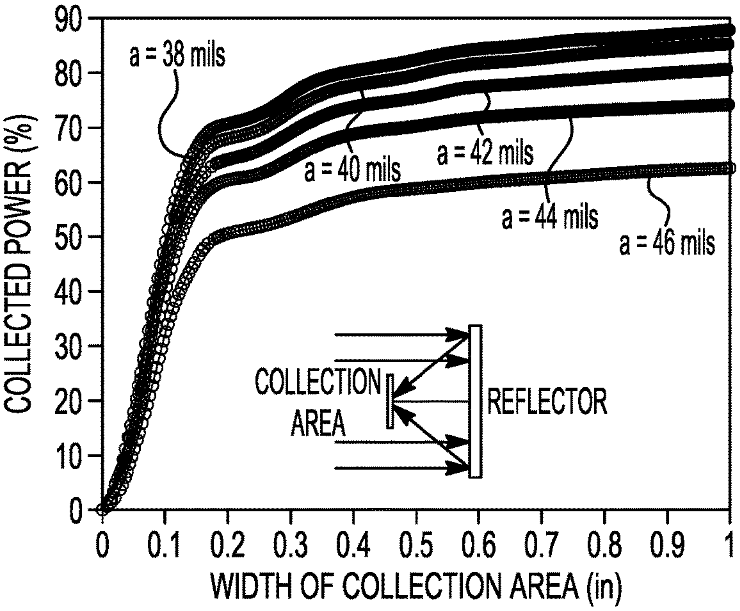
FIG. 22 a graph showing collected power vs. collection area width for different hole radii.

FIG. 22 illustrates a plot of collected power as a function of collection area width for different perforation radii (with uniform radii for perforations for each of the examples). Here the collected power is the normal component of Poynting vector integrated over a square area having sides up to 1" in length as a percentage of incident power over the same area. The best collection efficiency is realized with a perforation radius of 38 mils.

Figure 23:
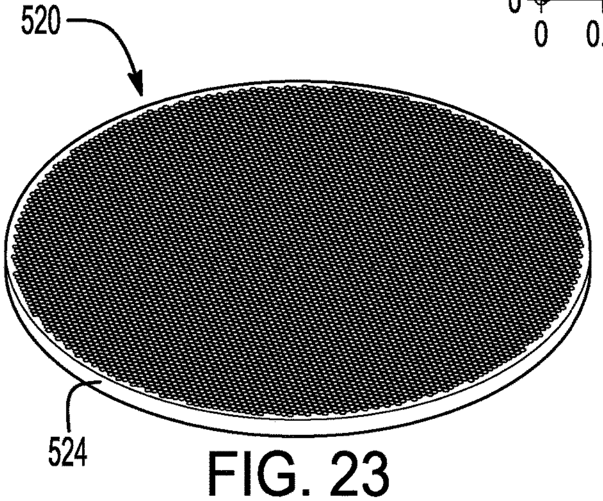
FIG. 23 is an oblique view of a wavefront transformer according to an embodiment.
Figure 24:
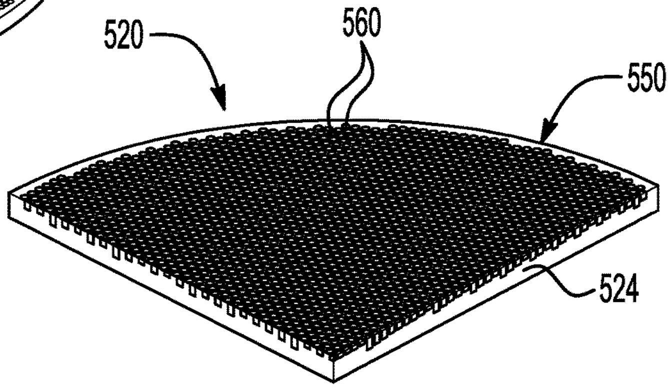
FIG. 24 is an oblique view of a section of the wavefront transformer of FIG. 23.
Figure 25:
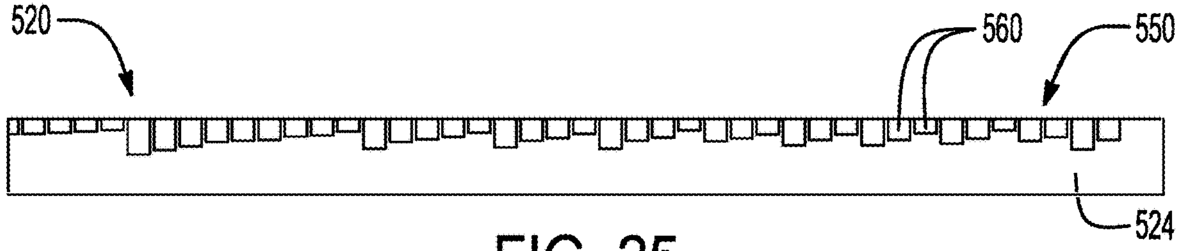
FIG. 25 is a cross-sectional view of the wavefront transformer of FIG. 24.

FIGS. 23-25 illustrate a wavefront transformer 520 that has perforations 550 in a substrate 524. The perforations 550 are filled with a solid dielectric material 560. The dielectric material 560 may be a polymer material such as polyethylene. The dielectric material 560 should be taken account of when configuring the wavefront transformer 520, such as when choosing the radius (or varying radii) of the perforations 550, the depth(s) of the perforations 550, and/or the spacing (constant or varying) the perforations 550.

Figure 26:
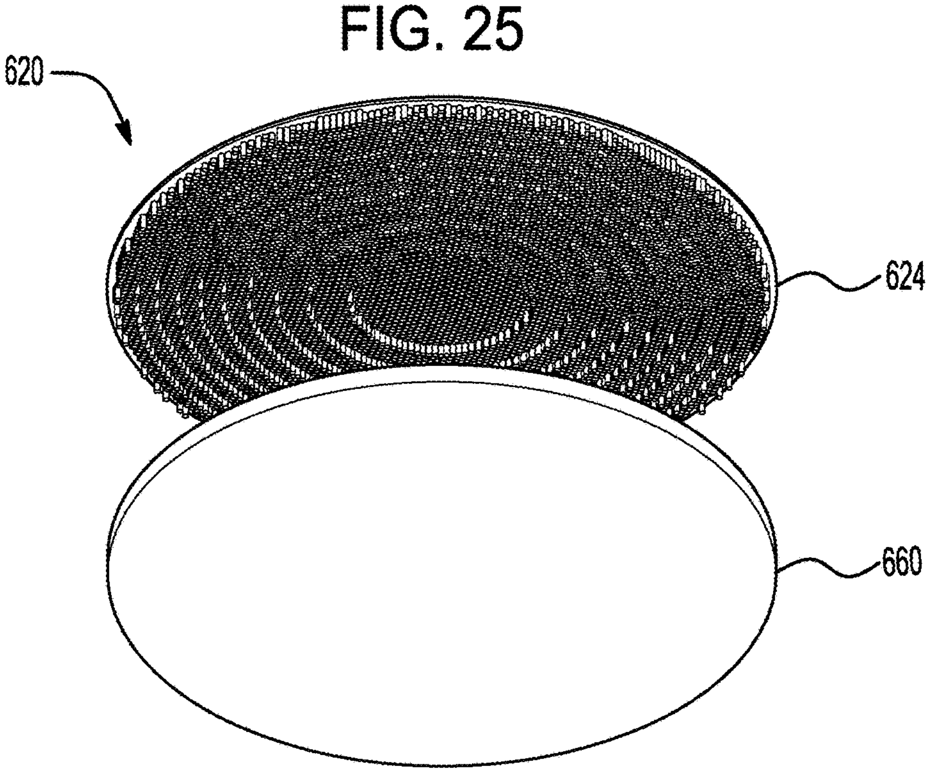
FIG. 26 is an exploded view of a wavefront transformer according to an embodiment.
Figure 27A:
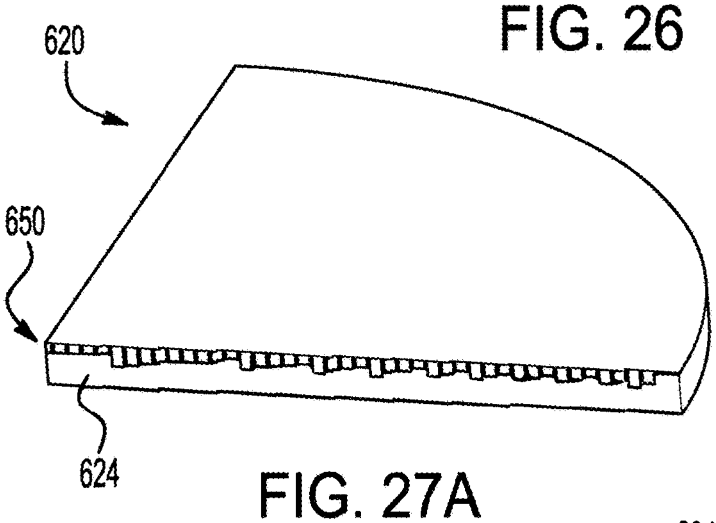
FIG. 27A is an oblique view of a section of the wavefront transformer of FIG. 26.
Figure 27B:
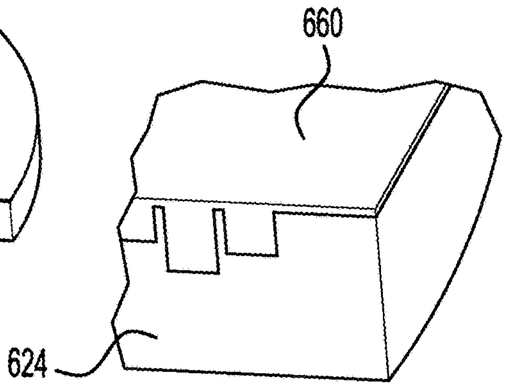
FIG. 27B is a magnified view of a portion of the view of FIG. 27A.

FIGS. 26-27B show a variant of the dielectric-filled perforations of the wavefront transformer 520 (FIG. 23), a wavefront transformer 620 which includes a substrate 624 that has perforations 650 that are filled with and covered by a solid dielectric material 660 that also covers an upper surface 664 of the substrate 624. The dielectric material 660 may constitute a separate unitary continuous piece of material, as shown in FIG. 26. In one embodiment of the wavefront transformer 620 the dielectric material is removed down to the upper surface 664.

Figure 27C:
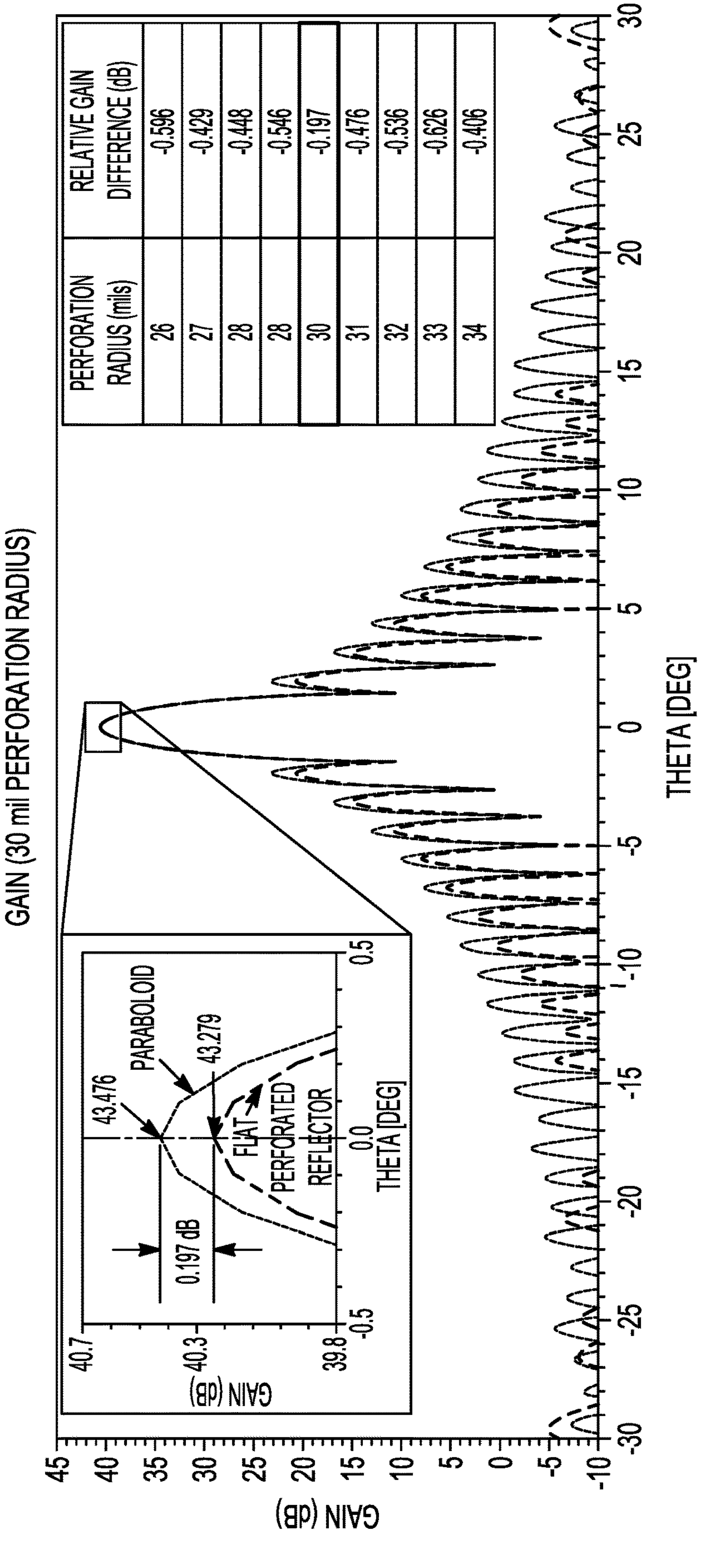
FIG. 27C is a graph comparing gain of an embodiment of the wavefront transformer of FIG. 26 with a parabolic reflector.

Filling the perforations 650 with dielectric material provides several advantages. It reduces the cutoff frequency for a given cavity diameter and allows perforations to be made smaller and less deep, and to be placed closer together (reduced center-to-center spacing). Performance (gain) may be improved, relative to reflectors with unfilled cavities, by the use of the smaller, more densely packed, perforations. Reduced perforation depth yields smaller reflected-wave loss. Finer sampling of the incident wavefront (more cavities per square wavelength) occurs due to reduced center-to-center spacing, which yields increased gain. In an embodiment in which holes are filled with polyethylene, the gain is only 0.2 dB less than that of a corresponding parabolic reflector, as shown in FIG. 27C. Filling of perforations also provides the advantages of a cover over the reflector, preventing dirt/moisture accumulation in the perforations.

Figure 28A:
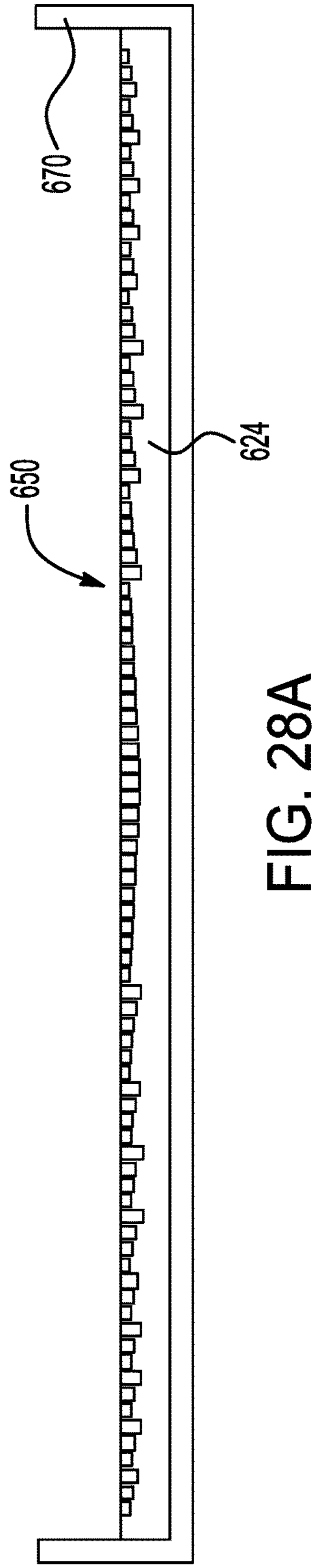
FIG. 28A is a cross-sectional view of a first step in formation of the wavefront transformer of FIG. 26.
Figure 28B:
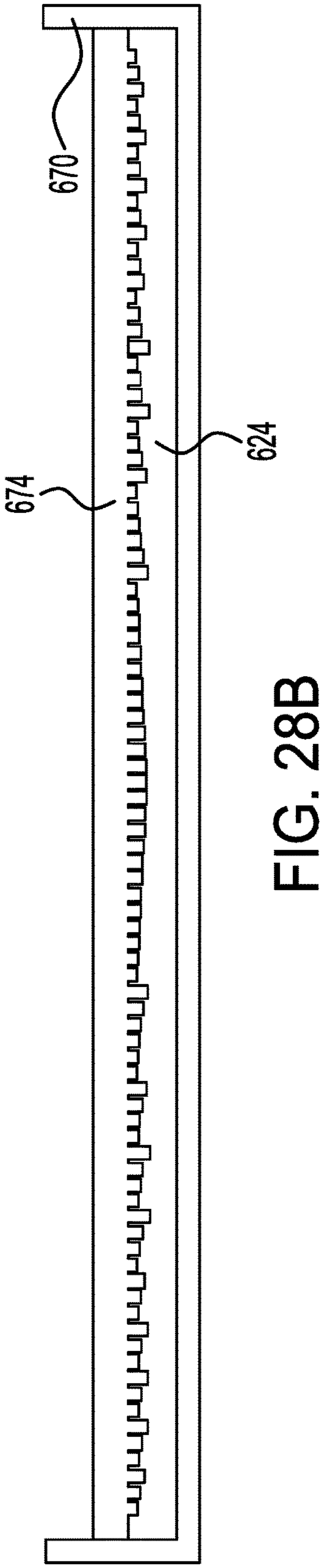
FIG. 28B is a cross-sectional view of a second step in formation of the wavefront transformer of FIG. 26.
Figure 28C:
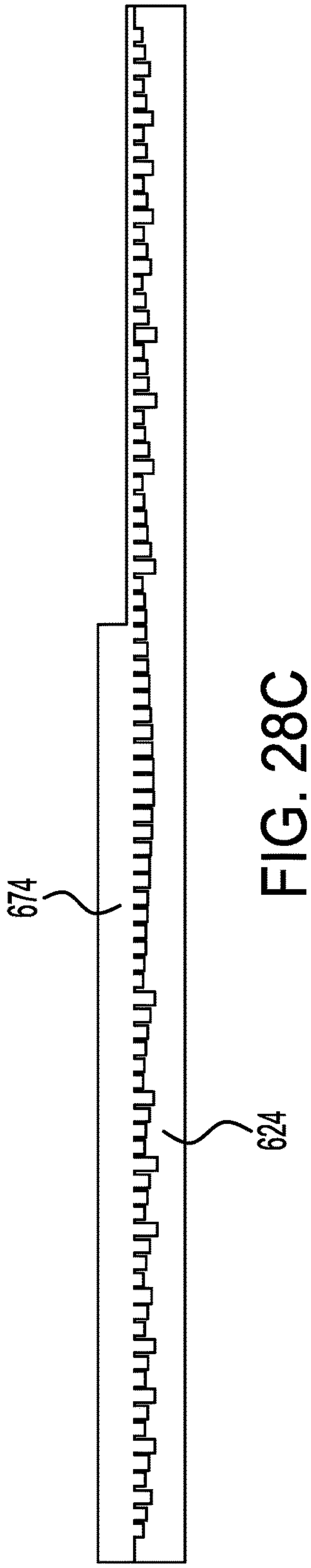
FIG. 28C is a cross-sectional view of a third step in formation of the wavefront transformer of FIG. 26.

FIGS. 28A-28C show steps in formation of the wavefront transformer 620 (FIG. 26). In a first step, illustrated in FIG. 28A, the substrate 624 (FIG. 26), with the perforations 650

(FIG. 26) machined in, is placed in a mold 670. In a second step, illustrated in FIG. 28B, the mold 670 is filled with a low-loss, low-viscosity liquid resin 674. Suitable resins include members of the SLK family of silicone-based thermosetting resins from Shin-Etsu Chemical Company, Ltd., for which $\varepsilon_R<2.5$ and tan $\delta<0.0025$ at W-band frequencies. The resin is mixed and de-bubbled, both preferably under vacuum. After curing of the resin 674 (under pressure to force trapped air bubbles to the surface) and removal from the mold 670, the top surface of the resin 674 is machined, as illustrated in FIG. 28C.

Figure 29:
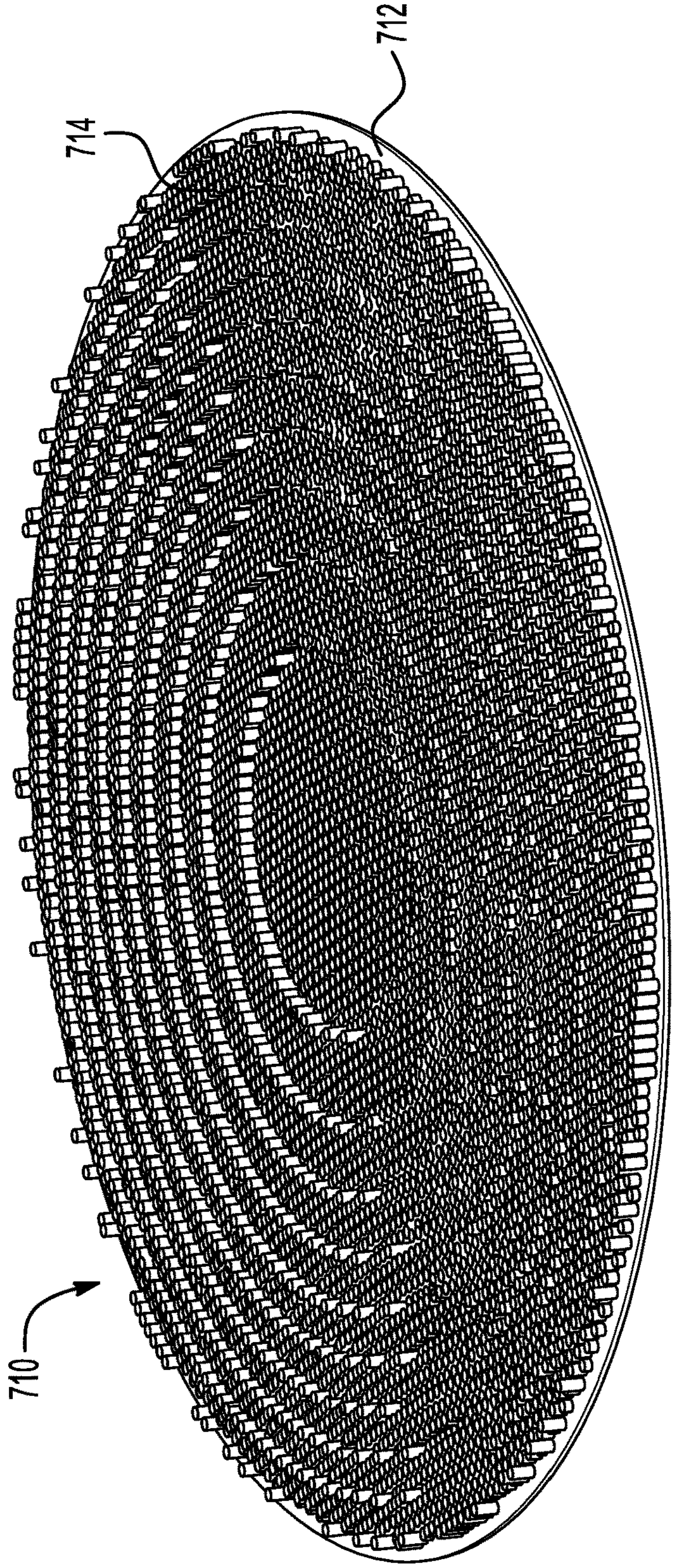
FIG. 29 is an oblique view of a mandrel usable in constructing and/or being a part of a wavefront transformer, according to an embodiment.
Figure 30:
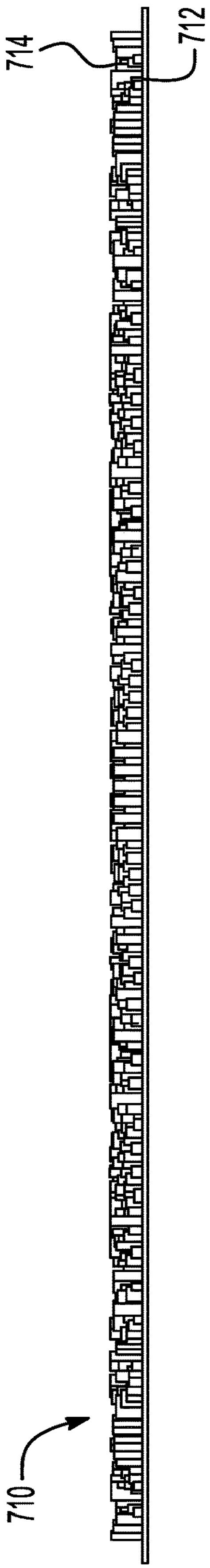
FIG. 30 is a side view of the mandrel of FIG. 29.

The cavities in the various embodiments may be formed by any of a variety of suitable methods. One method is by machining holes to produce the perforations. Another way, illustrated by FIGS. 29 and 30, is by use of a form or mandrel 710. The mandrel 710 may be a plate 712 with protrusions 714 thereupon that correspond to the desired perforations of a wavefront transformer. The mandrel 710 may be used to produce the substrate with the desired perforations by placing material for the substrate directly on the mandrel 710. The mandrel 710 may be made of a suitable material, such as a suitable polymer. The mandrel 710 may be formed by molding, or by any other suitable method.

Figure 31:
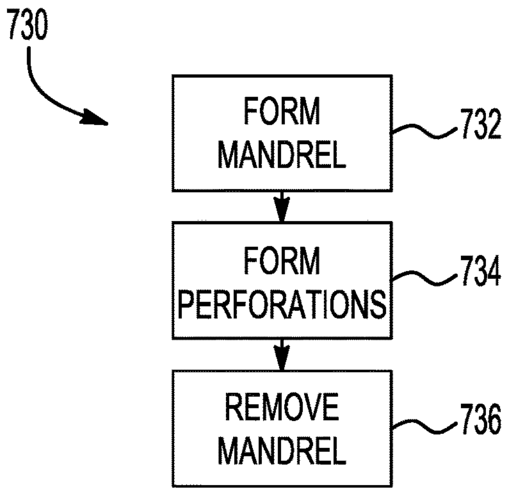
FIG. 31 is a high-level flow chart of a method for forming a wavefront transformer, according to an embodiment.

FIG. 31 is a high-level flow chart of a method 730 for producing a wavefront transformer using the mandrel 710 (FIG. 29). In step 732 the mandrel 710 is formed. In step 734 perforations (cavities) in a substrate are formed, with the perforations corresponding to the shape and spacing of the protrusions 714 (FIG. 30) on the plate 712 (FIG. 30) of the mandrel 710. In step 734 the mandrel 710 may be removed, although this step should be considered optional, as it may be advantageous to leave the mandrel 710 in place as part of the wavefront transformer, for example producing something along the lines of the wavefront transformer 620 (FIG. 27).

Figure 32:
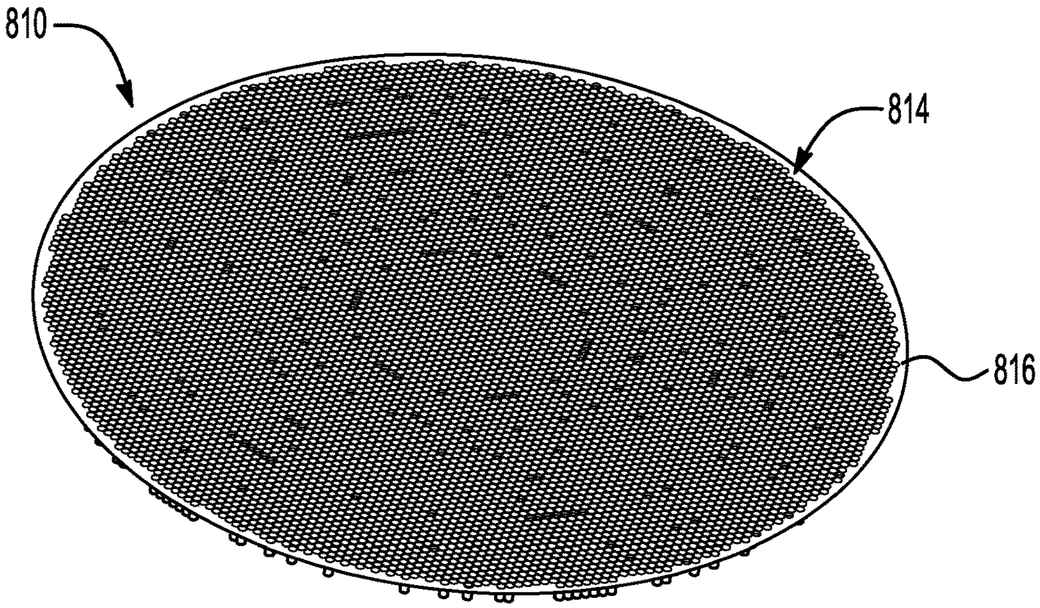
FIG. 32 is an oblique view of a reflector of a wavefront transformer, according to an embodiment.
Figure 33:
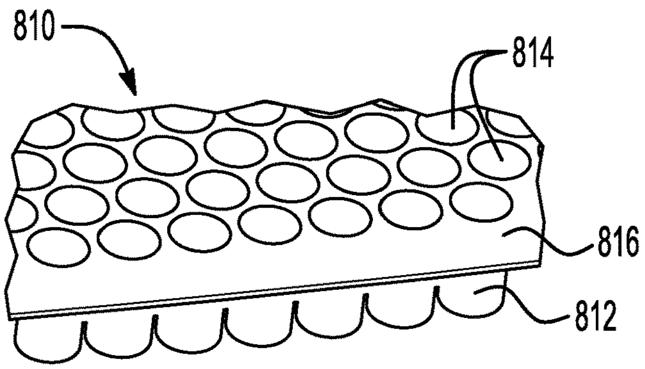
FIG. 33 is a magnified view of a portion of the reflector of FIG. 32.

FIGS. 32 and 33 show a reflector 810 formed by metallizing a surface of the mandrel 710 (FIG. 29). The reflector 810 has protrusions 812 that define perforations 814. The reflector 810, including surfaces of the perforations 814, are plated with a conductive material 816. The conductive material 816 may be placed by electroplating or electroforming, such as to deposit copper. The reflector 810 can retain part of the mandrel 710, for example to provide dielectric material filling the perforations 814. Alternatively, the mandrel 710 may be fully removed after the metallization. Exposed surfaces of the reflector 810 may be protected by a layer of plated nickel followed by a thin layer of plated gold.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A wavefront transformer for transforming an incident electromagnetic wavefront having a given shape to a reflected wavefront having a different shape, the wavefront transformer comprising:

a reflector having a conductive surface configured to reflect the incident electromagnetic wavefront, the incident electromagnetic wavefront having one or more intended incident frequencies; and a dielectric material cover overlying the reflector;

wherein the reflector has a plurality of protrusions extending from the reflector defining uniformly spaced cavities, each of the cavities having substantially a same radius;

wherein the cavities have varying depths, the depths of the cavities configured to impose a desired transformation on the incident electromagnetic wavefront;

wherein the radius of the cavities is within 25% of a cutoff radius for a lowest of the one or more intended incident frequencies, the cutoff radius being a radius for which a waveguide phase propagation constant of the lowest of the one or more intended incident frequencies is zero; and wherein the dielectric material cover includes additional protrusions that enter into respective ones of the cavities, the additional protrusions corresponding with the protrusions extending from the reflector.

2. The wavefront transformer of claim 1, wherein the radius of the cavities is within 10% of the cutoff radius for the lowest of the one or more intended incident frequencies.

3. The wavefront transformer of claim 1, wherein the radius of the cavities is within 5% of the cutoff radius for the lowest of the one or more intended incident frequencies.

4. The wavefront transformer of claim 1, wherein each of the cavities is cylindrical.

5. The wavefront transformer of claim 1, wherein the dielectric material cover is made of polytetrafluoroethylene (PTFE).

6. The wavefront transformer of claim 1, wherein the dielectric material cover is made of a solid dielectric material.

7. The wavefront transformer of claim 1, wherein the dielectric material cover is made of a polymer.

8. The wavefront transformer of claim 1, wherein the cavities are in an equilateral-triangle-spaced grid.

9. The wavefront transformer of claim 1, wherein the reflector comprises conductive material on a surface of the dielectric material cover.

10. The wavefront transformer of claim 1, wherein the dielectric material cover is made of polyethylene.

11. A wavefront transformer for transforming an incident electromagnetic wavefront having a given shape to a reflected wavefront having a different shape, the wavefront transformer comprising:

a reflector having a conductive material on a surface of a mandrel and configured to reflect the incident electromagnetic wavefront, the incident electromagnetic wavefront having one or more intended incident frequencies;

wherein the reflector has a plurality of protrusions extending from the reflector defining spaced cavities;

wherein the cavities have varying dimensions and/or spacings, the varying dimensions and/or spacings of the cavities configured to impose a desired transformation on the incident electromagnetic wavefront;

wherein a radius of at least some of the cavities is within 25% of a cutoff radius for a lowest of the one or more intended incident frequencies, the cutoff radius being a radius for which a waveguide phase propagation constant of the lowest of the one or more intended incident frequencies is zero; and wherein the cavities are filled by the mandrel.

12. The wavefront transformer of claim 11, wherein the mandrel also overlies the conductive material.

13. The wavefront transformer of claim 11, wherein the mandrel is a solid dielectric material.

14. The wavefront transformer of claim 13, wherein the solid dielectric material is a polymer.

15. The wavefront transformer of claim 13, wherein the solid dielectric material includes polyethylene or polytetrafluoroethylene (PTFE).

16. The wavefront transformer of claim 11, wherein the cavities have varying cross-sectional dimensions and/or depths.

17. A wavefront transformer for transforming an incident electromagnetic wavefront having a given shape to a reflected wavefront having a different shape, the wavefront transformer comprising:

a cover; and a reflector having a conductive surface formed on a surface of the cover and configured to reflect the incident electromagnetic wavefront, the incident electromagnetic wavefront having one or more intended incident frequencies, wherein the reflector has a plurality of protrusions extending from the reflector defining spaced cavities, and wherein the cavities have varying depths, the depths of the cavities configured to impose a desired transformation on the incident electromagnetic wavefront;

wherein the cover overlies the reflector and fills the cavities.

18. The wavefront transformer of claim 17, wherein the cover is made of a dielectric material.

19. The wavefront transformer of claim 17, wherein the cover has a thickness of 10 mils or less.

20. The wavefront transformer of claim 17, wherein the conductive surface is placed on the surface of the cover by electroplating or electroforming.

* * * * *